(12) United States Patent
Kanno et al.

(10) Patent No.: US 6,876,468 B1
(45) Date of Patent: Apr. 5, 2005

(54) IMAGE PROCESSING APPARATUS THAT PERFORMS BLACK COLORING, GAMMA CORRECTION AND TONE PROCESSING

(75) Inventors: Hiroki Kanno, Yokohama (JP); Sunao Tabata, Yokohama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 865 days.

(21) Appl. No.: 09/663,690

(22) Filed: Sep. 19, 2000

(51) Int. Cl.[7] .............................. H04N 1/56; H04N 1/60; H04N 1/48

(52) U.S. Cl. ..................... 358/1.9; 358/2.1; 358/3.03; 358/518; 358/521; 382/252

(58) Field of Search ....................... 358/1.9, 2.1, 3.05, 358/518, 521, 448, 3.04, 3.03, 465, 466, 447; 345/600, 605, 616; 382/252, 237

(56) References Cited

U.S. PATENT DOCUMENTS

| | | | | |
|---|---|---|---|---|
| 5,162,925 A | * | 11/1992 | Takaoka et al. | ............ 358/447 |
| 5,689,588 A | * | 11/1997 | Rombola et al. | ............ 382/237 |
| 5,907,370 A | * | 5/1999 | Suzuki et al. | ............ 348/607 |
| 6,598,197 B1 | * | 7/2003 | Peterson et al. | ............ 714/763 |

FOREIGN PATENT DOCUMENTS

| | | | | |
|---|---|---|---|---|
| JP | 11-331586 A | | 11/1999 | |
| JP | 2000228731 | * | 8/2000 | .......... H04N/5/213 |

OTHER PUBLICATIONS

Koide et al.; "A Data Embedding Method for Bilevel Based on the Error Diffusion Method and the Mean Density Approximation Method"; 1996; pp. 7–14.

* cited by examiner

*Primary Examiner*—Scott A. Rogers
(74) *Attorney, Agent, or Firm*—Foley & Lardner LLP

(57) ABSTRACT

A lower-bit replacement means of an information addition means replaces lower 3 bits of an 8-bit image signal with 3 bits of an image area separation signal, and outputs an 8-bit conversion image signal. A lower-bit extraction means of an information extraction means extracts lower 3 bits of the 8-bit conversion image signal and outputs an image area separation signal as additional information. On the other hand, as regards image information, the conversion image signal input to the information extraction means is output as it is, as an image signal.

11 Claims, 21 Drawing Sheets

A=7/16

B=1/16

C=5/16

D=3/16

A=1

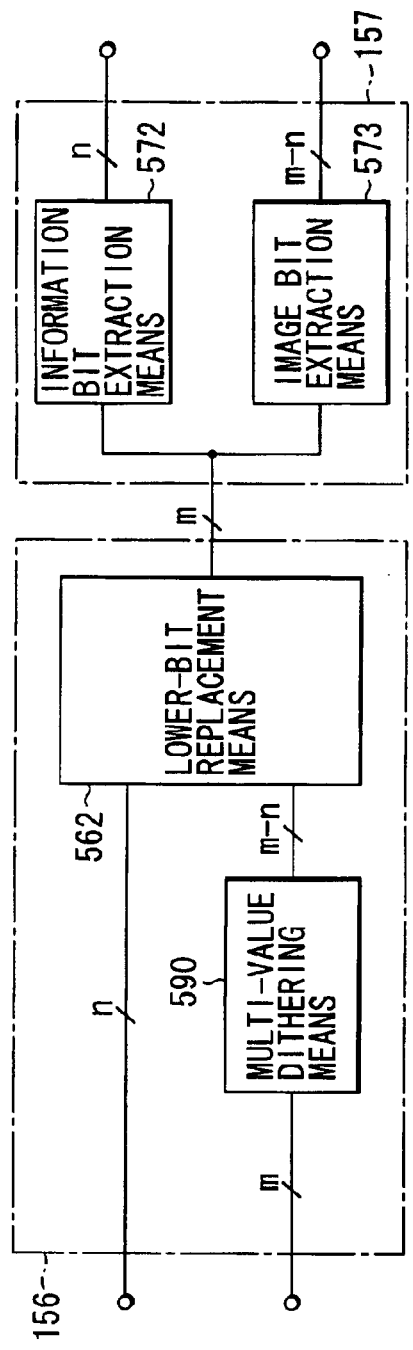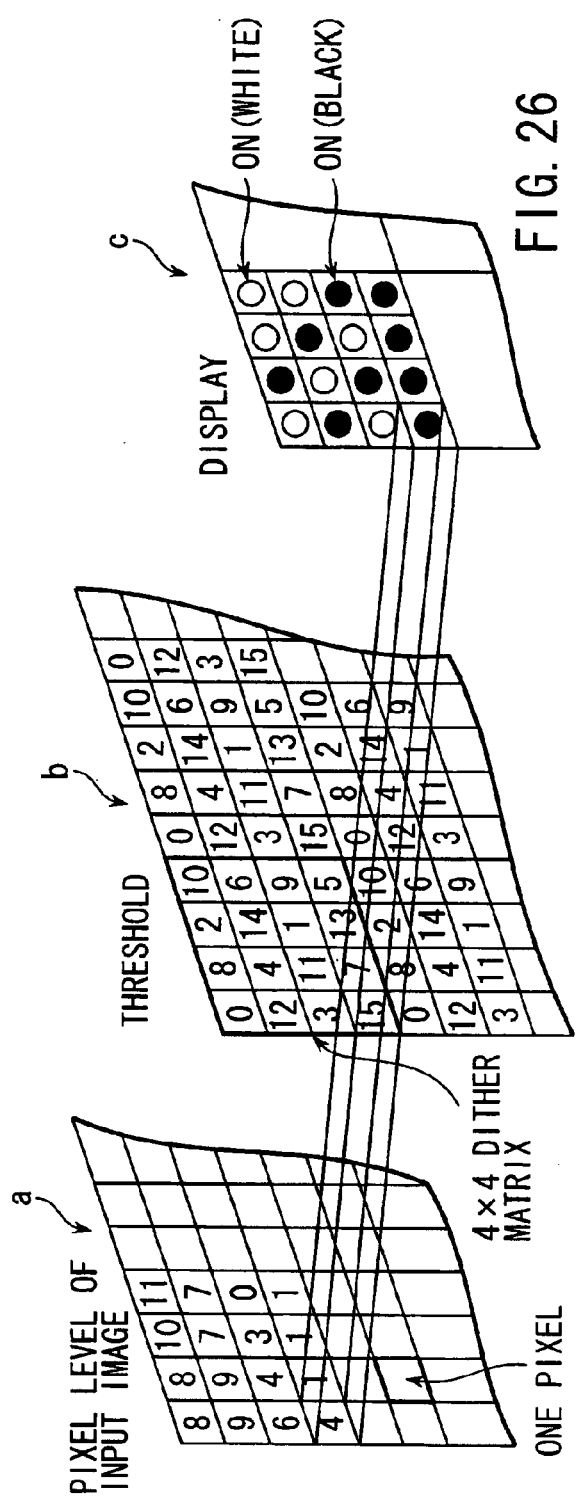

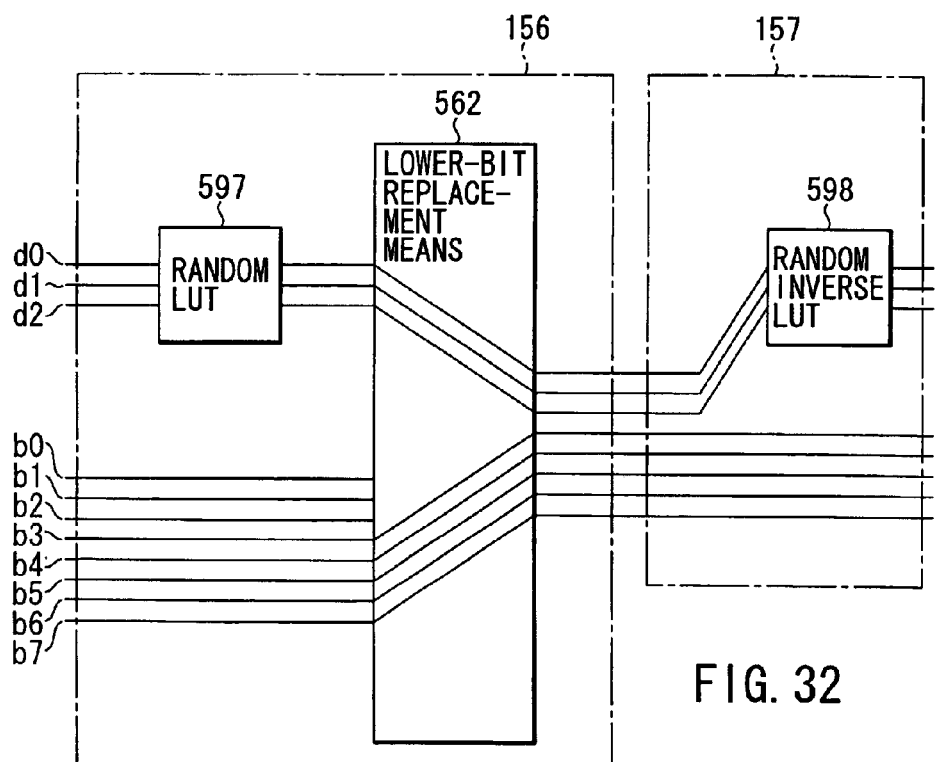

IMAGE PROCESSING APPARATUS THAT PERFORMS BLACK COLORING, GAMMA CORRECTION AND TONE PROCESSING

BACKGROUND OF THE INVENTION

The present invention relates to an image processing apparatus used in an image forming apparatus such as a digital copying machine wherein an image of an original is read by image reading means such as a scanner, the read image is subjected to a predetermined image process such as an image quality process or an editing process, and the resultant image is printed out on a paper sheet by image forming means such as an electrophotographic printer.

In most conventional devices dealing with images, such as a color/monochromatic copying machine, a scanner or a printer, an image signal is expressed by 8 bits per pixel. The reason is that, in either of a case of treating an image by software and a case of treating an image by hardware, processing in an 8-bit unit is easy because of limitations of memory structure, and if more than 8 bits are used, double the number of bits is required.

For example, in the case of a color image, incident light is converted by a color image sensor to electric signals of three primary colors, R (red), G (green) and B (blue). In this case, 8 bits×3=24 bits are required. On the other hand, in the case of color-separated images, which are separated on the basis of a well-known subtractive color mixing process, that is, four-color images C, M, Y and K of yellow (y), magenta (m), cyan (c) and black (k), 8 bits×4=32 bits are required. In an L*a*b* color space, 8 bits×3=24 bits are required.

When an image is treated by a copying machine, there is a case where image information of several bits, in addition to 8-bit image signal processing, needs to be processed at the same time.

For example, in the case of the copying machine, in general, in order to obtain a high-quality output image, image areas of a character part and a photograph part of an original are separated and different image processes are carried out for the character part and photograph part (sharpness is given to the character part with important put on the resolution), and smoothness given to the photograph part with importance put on the tone). In this case, a process block for separating image areas is provided in the image process. The block for image area separation outputs a 1-bit discrimination signal representing, for example, whether the object pixel is a character or a photograph. A filter block uses the 1-bit discrimination signal and, where the 1-bit discrimination signal represents "character", the filter block performs a filtering process by selecting a filter parameter which is suitable for character reproduction and enhances the resolution. Where the discrimination signal represents "photograph", the filter block performs a filtering process by selecting a filter parameter which is suitable for a photograph and smoothes the image. Thus, the suitable image process corresponding to the discrimination signal is enabled, and high-quality output images can be obtained.

However, if the above-described 1-bit discrimination signal is used for each pixel, a 9-bit image signal is needed. That is, the 1-bit discrimination signal is added to the 8-bit image signal. The use of the image signal of more than 8 bits makes the system design difficult and increases the cost because of the limitations of hardware and software. Even where several-bit additional information needs to be processed in addition to the 8-bit image signal, it is desirable that processing of 8 bits in total be carried out for reasons of hardware and software.

In order to solve this problem, there may be a method of compressing an (8+n) bit image signal to 8-bit signal. However, in an ordinary compression system, image information may be lost at the time of compression. In particular, loss of n-bit additional information is very serious in the system. Thus, it is not proper to compress an (8+n) bit image signal to 8-bit signal. Moreover, the compressing process itself increases hardware cost and contradicts the reduction in the number of bits of images. Therefore, there is a demand for the advent of a method wherein an (8+n) bit image signal can easily be converted to 8-bit signal and necessary information and an n-bit image signal can be extracted without loss.

BRIEF SUMMARY OF THE INVENTION

The object of the present invention is to provide an image processing apparatus capable of obtaining a conversion image signal by easily adding information to an image signal at low cost with minimum degradation of image, and additional information can be exactly extracted from the conversion image signal including the additional information.

In order to achieve this object, the present invention provides an image processing apparatus wherein a first processing circuit and a second processing circuit are connected in m bits, the apparatus comprising: replacement means for replacing lower n bits of an m-bit image signal with n-bit additional information, and outputting an m-bit conversion image signal; error calculation means for calculating an error between the m-bit conversion image signal replaced by the replacement means and the m-bit image signal before the replacement; an error buffer for storing the error calculated by the error calculation means; weight coefficient storage means for prestoring a weight coefficient for calculating a weight error; weight error calculation means for calculating a weight error by multiplying the error stored in the error buffer by the weight coefficient stored in the weight coefficient storage means; error correction means for correcting the m-bit image signal before the replacement, using the weight error calculated by the weight error calculation means; and extraction means for extracting the lower n bits of the m-bit conversion image signal replaced and output from the replacement means.

The present invention also provides an image processing apparatus wherein a first processing circuit and a second processing circuit are connected in m bits, the apparatus comprising: multi-value means for subjecting an m-bit image signal to a multi-value process and converting the m-bit image signal to an m-n bit image signal; error calculation means for calculating an error between the m-n bit image signal multi-value-processed by the multi-value means and the m-bit image signal before subjected to the multi-value process; an error buffer for storing the error calculated by the error calculation means; weight coefficient storage means for prestoring a weight coefficient for calculating a weight error; weight error calculation means for calculating a weight error by multiplying the error stored in the error buffer by the weight coefficient stored in the weight coefficient storage means; error correction means for correcting the m-bit image signal before the multi-value process, using the weight error calculated by the weight error calculation means; addition means for adding n-bit information to the m-n bit image signal multi-valued-processed by the multi-value means, and outputting an m-bit conversion image signal; first extraction means for extracting information bits of n bits from the m-bit conversion image signal output from the addition means; and second extraction means for extracting image bits of m-n bits from the m-bit conversion image signal output from the addition means.

The present invention also provides an image processing apparatus wherein a first processing circuit and a second processing circuit are connected in m bits, the apparatus comprising: first replacement information pixel determination means for specifying n pixels within j×k pixels; replacement means for replacing, where the first replacement information pixel determination means has determined that process target pixels are specific n pixels, specific bits of an m-bit image signal with specific bits of n-bit additional information, and outputting an m-bit conversion image signal; second replacement information pixel determination means for specifying n pixels within j×k pixels; and information bit extraction means for extracting, where the second replacement information pixel determination means has determined that process target pixels are specific n pixels, specific bits of the m-bit conversion image signal output from the replacement means, and reconstructing information bits of n bits within the j×k pixels.

The present invention also provides an image processing apparatus wherein a first processing circuit and a second processing circuit are connected in m bits, the apparatus comprising: first replacement information pixel determination means for specifying n pixels within j×k pixels; replacement means for replacing, where the first replacement information pixel determination means has determined that process target pixels are specific n pixels, specific bits of an m-bit image signal with specific bits of n-bit additional information, and outputting an m-bit conversion image signal; error calculation means for calculating an error between the m-bit conversion image signal replaced by the replacement means and the m-bit image signal before the replacement; an error buffer for storing the error calculated by the error calculation means; weight coefficient storage means for prestoring a weight coefficient for calculating a weight error; weight error calculation means for calculating a weight error by multiplying the error stored in the error buffer by the weight coefficient stored in the weight coefficient storage means; error correction means for correcting the m-bit image signal before the replacement, using the weight error calculated by the weight error calculation means; second replacement information pixel determination means for specifying n pixels within j×k pixels; and information bit extraction means for extracting, where the second replacement information pixel determination means has determined that process target pixels are specific n pixels, specific bits of the m-bit conversion image signal replaced and output from the replacement means, and reconstructing information bits of n bits within the j×k pixels.

The present invention also provides an image processing apparatus wherein a first processing circuit and a second processing circuit are connected in m bits, the apparatus comprising: first replacement information pixel determination means for specifying n pixels within j×k pixels; replacement means for replacing, where the first replacement information pixel determination means has determined that process target pixels are specific n pixels, lower n bits of an m-bit image signal with n-bit additional information, and outputting an m-bit conversion image signal; error calculation means for calculating an error between the m-bit conversion image signal replaced by the replacement means and the m-bit image signal before the replacement; an error buffer for storing the error calculated by the error calculation means; weight coefficient storage means for prestoring a weight coefficient for calculating a weight error; weight error calculation means for calculating a weight error by multiplying the error stored in the error buffer by the weight coefficient stored in the weight coefficient storage means; error correction means for correcting the m-bit image signal before the replacement, using the weight error calculated by the weight error calculation means; second replacement information pixel determination means for specifying n pixels within j×k pixels; and extraction means for extracting, where the second replacement information pixel determination means has determined that process target pixels are specific n pixels, the lower n bits of the m-bit conversion image signal replaced and output from the replacement means.

The present invention also provides an image processing apparatus wherein a first processing circuit and a second processing circuit are connected in l bits, the apparatus comprising: multi-value means for subjecting an m-bit image signal to a multi-value process and converting the m-bit image signal to an l-n ($n<l<m$) bit image signal; error calculation means for calculating an error between the l-n bit image signal multi-value-processed by the multi-value means and the m-bit image signal before subjected to the multi-value process; an error buffer for storing the error calculated by the error calculation means; weight coefficient storage means for prestoring a weight coefficient for calculating a weight error; weight error calculation means for calculating a weight error by multiplying the error stored in the error buffer by the weight coefficient stored in the weight coefficient storage means; error correction means for correcting the m-bit image signal before the multi-value process, using the weight error calculated by the weight error calculation means; addition means for adding n-bit information to the l-n bit image signal multi-valued-processed by the multi-value means, and outputting an l-bit conversion image signal; first extraction means for extracting information bits of n bits from the l-bit conversion image signal output from the addition means; and second extraction means for extracting image bits of l-n bits from the l-bit conversion image signal output from the addition means.

The present invention also provides an image processing apparatus wherein a first processing circuit and a second processing circuit are connected in m bits, the apparatus comprising: multi-value dithering means for subjecting an m-bit image signal to a multi-value process and converting the m-bit image signal to an m-n bit image signal; addition means for adding n-bit information to the m-n bit image signal multi-valued-processed by the multi-value dithering means, and outputting an m-bit conversion image signal; first extraction means for extracting information bits of n bits from the m-bit conversion image signal output from the addition means; and second extraction means for extracting image bits of m-n bits from the m-bit conversion image signal output from the addition means.

The present invention also provides an image processing apparatus wherein a first processing circuit and a second processing circuit are connected in m bits, the apparatus comprising: difference information extraction means for extracting a difference of n-bit additional information of successive two pixels; replacement means for replacing where the difference extracted by the difference information extraction means is not 0, n bits from lower n+1 bits of an m-bit image signal with additional information, a least significant bit with 1, and also replacing, where the difference extracted by the difference information extraction means is 0, the least significant bit with 0, and outputting an m-bit conversion image signal; error calculation means for calculating an error between the m-bit conversion image signal replaced by the replacement means and the m-bit image signal before the replacement; an error buffer for storing the error calculated by the error calculation means;

weight coefficient storage means for prestoring a weight coefficient for calculating a weight error; weight error calculation means for calculating a weight error by multiplying the error stored in the error buffer by the weight coefficient stored in the weight coefficient storage means; error correction means for correcting the m-bit image signal before the replacement, using the weight error calculated by the weight error calculation means; and extraction means for extracting the lower n bits of the m-bit conversion image signal replaced and output from the replacement means.

This invention also provides an image processing apparatus wherein a first processing circuit and a second processing circuit are connected in m bits, the apparatus comprising: first replacement bit determination means for specifying n bits in an m-bit image signal; replacement means for replacing the n bits specified by the first replacement bit determination means with n-bit additional information, and outputting an m-bit conversion image signal; error calculation means for calculating an error between the m-bit conversion image signal replaced by the replacement means and the m-bit image signal before the replacement; an error buffer for storing the error calculated by the error calculation means; weight coefficient storage means for prestoring a weight coefficient for calculating a weight error; weight error calculation means for calculating a weight error by multiplying the error stored in the error buffer by the weight coefficient stored in the weight coefficient storage means; error correction means for correcting the m-bit image signal before the replacement, using the weight error calculated by the weight error calculation means; second replacement bit determination means for specifying n bits in the m-bit image signal; and extraction means for extracting the n bits specified by the second replacement bit determination means from the m-bit conversion image signal output from the replacement means.

This invention also provides an image processing apparatus wherein a first processing circuit and a second processing circuit are connected in m bits, the apparatus comprising: conversion means for converting n-bit additional information to a random n-bit string; replacement means for replacing lower n bits of an m-bit image signal with the random n-bit spring converted by the conversion means, and outputting an m-bit conversion image signal; error calculation means for calculating an error between the m-bit conversion image signal replaced by the replacement means and the m-bit image signal before the replacement; an error buffer for storing the error calculated by the error calculation means; weight coefficient storage means for prestoring a weight coefficient for calculating a weight error; weight error calculation means for calculating a weight error by multiplying the error stored in the error buffer by the weight coefficient stored in the weight coefficient storage means; error correction means for correcting the m-bit image signal before the replacement, using the weight error calculated by the weight error calculation means; extraction means for extracting lower n bits of the m-bit conversion image signal replaced and output from the replacement means; and inverse conversion means for subjecting the lower n bits extracted by the extraction means to an inverse conversion of the conversion by the conversion means.

BRIEF DESCRIPTION OF SEVERAL VIEWS OF THE DRAWING

FIG. 25 is a block diagram showing the structures of information addition means and information extraction means according to a seventh embodiment of the invention;

FIG. 26 shows an example of a two-value output according to a dithering method;

FIG. 28 is a view for explaining an information addition method in the case of using differential information;

FIG. 29 is a view for explaining an information addition method in the case of using differential information;

FIG. 31 is a view for explaining replacement of bits; and

FIG. 32 is a block diagram showing the structure of lower-bit replacement means in a tenth embodiment of the invention.

DETAILED DESCRIPTION OF THE INVENTION

Embodiments of the present invention will now be described with reference to the accompanying drawings.

Figure 1:
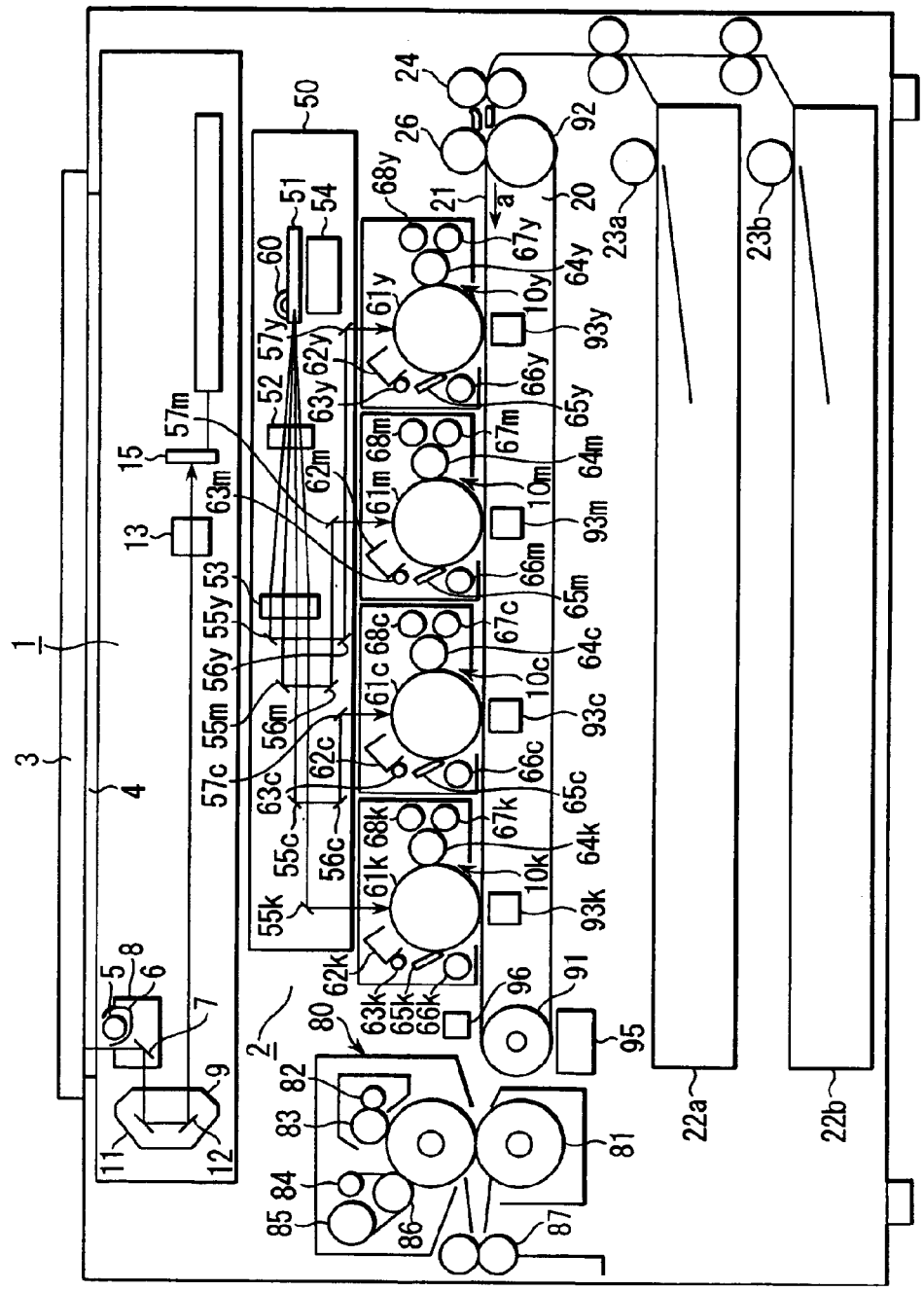
FIG. 1 schematically shows an internal structure of an image forming apparatus, such as a digital color copying machine, for forming a copy image of a color image according to the present invention.

FIG. 1 schematically shows an internal structure of a color image forming apparatus according to the present invention, such as a digital color copying machine, for forming a copy image of a color image. In general terms, the color image forming apparatus comprises a color scanner section 1 serving as image reading means for reading a color image on an original, and a color printer section 2 serving as image forming means for forming a copy image of the read color image.

The color scanner section 1 has an original table cover 3 on its upper part, and an original table 4 formed of transparent glass and disposed to face the original table cover 3 in the closed state. An original is placed on the original table 4. Below the original table 4, there are provided an exposure lamp 5 for illuminating the original placed on the original table 4; a reflector 6 for converging light from the exposure lamp 5 onto the original D; and a first mirror 7 for deflecting the reflection light from the original to the left in the figure. The exposure lamp 5, reflector 6 and first mirror 7 are fixed to a first carriage 8. The first carriage 8 is driven by a pulse motor (not shown) by means of a toothed belt (not shown), etc. so that the first carriage 8 may be moved in parallel along the lower surface of the original table 4.

A second carriage 9 is disposed on the left side (in the figure) of the first carriage 8, that is, on the side to which reflection light from the first mirror 7 is guided. The second carriage 9 is movable in parallel to the original table 4 by means of a drive mechanism (not shown) (e.g. a toothed belt and a DC motor). The second carriage 9 comprises a second mirror 11 for downwardly (in the figure) deflecting the reflection light from the original which has been guided by the first mirror 7, and a third mirror 12 for deflecting the reflection from the second mirror 11 to the right in the figure. The second mirror 11 and third mirror 12 are disposed at right angles to each other. The second carriage 9 follows the movement of the first carriage 8 and moves in parallel to the original table 4 at a speed equal to half the speed of the first carriage 8.

A focusing lens 13 for focusing the reflection light from the third mirror 12 at a predetermined magnification is disposed in a plane including an optical axis of the light deflected by the second and third mirrors 11 and 12. A CCD color image sensor (photoelectric conversion element) 15 for converting the reflection light converged by the focusing lens 13 to an electric signal is disposed in a plane substantially perpendicular to the optical axis of the light traveling through the focusing lens 13.

If light from the exposure lamp 5 is converged onto the original placed on the original table 4 by means of the reflector 6, the reflection light from the original is made incident on the color image sensor 15 via the first mirror 7, second mirror 11, third mirror 12 and focusing lens 13. The color image sensor 15 converts the incident light to electric signals of the three primary colors, R (red), G (green) and B (blue).

The color printer section 2 has first to fourth image forming units 10y, 10m, 10c and 10k for, producing images of four colors, yellow (Y), magenta (M), cyan (C) and black (K), which are color-separated according to a well-known subtractive color mixing process.

A convey mechanism 20 is disposed below the image forming units 10y, 10m, 10c and 10k. The convey mechanism 20 includes a convey belt 21 serving as convey means for conveying color images produced by the respective image forming units in a direction indicated by an arrow a. The convey belt 21 is passed between a driving roller 91 rotated by a motor (not shown) in the direction of arrow a and a driven roller 92 disposed apart from the driving roller 91 by a predetermined distance. The convey belt 21 is endlessly run in the direction of arrow a at a fixed speed. The image forming units 10y, 10m, 10c and 10k are arranged in tandem in the direction of conveyance of the convey belt 21.

Each of the image forming unit 10y, 10m, 10c and 10k includes a photosensitive drum 61y, 61m, 61c, 10k serving as an image carrying body. The photosensitive drums 61y, 61m, 61c and 61k have outer peripheral surfaces which are rotatable in the same direction at points of contact with the convey belt 21. The photosensitive drums 61y, 61m, 61c and 61k are rotated by a motor (not shown) at a predetermined speed.

The photosensitive drums 61y, 61m, 61c and 61k are disposed to have their axes arranged at regular intervals from one another and in a direction perpendicular to the direction in which images are conveyed by the convey belt 21. In the description below, assume that the axial direction of each photosensitive drum 61y, 61m, 61c, 61k is referred to as a main scan direction (second direction), and the rotational direction of each photosensitive drum 61y, 61m, 61c, 61k, that is, the direction of running of the convey belt 21 (the direction of arrow a), is referred to as a sub-scan direction (first direction).

Around each of the photosensitive drum 61y, 61m, 61c and 61k, the following elements are disposed in order in the rotational direction: a charging device 62y, 62m, 62c, 62k serving as charging means, extended in the main scan direction; a destaticizer 63y, 63m, 63c, 63k; a developing roller 64y, 64m, 64c, 64k serving as developing means, similarly extended in the main scan direction; a lower stirring roller 67y, 67m, 67c, 67k; an upper stirring roller 68y, 68m, 68c, 68k; a transfer device 93y, 93m, 93c, 93k serving as transfer means, similarly extended in the main scan direction; a cleaning blade 65y, 65m, 65c, 65k similarly extended in the main scan direction; and a waste toner recovering screw 66y, 66m, 66c, 66k.

Each transfer device 93y, 93m, 93c, 93k is disposed at such a position as to sandwich the convey belt 21 between itself and the photosensitive drum 61y, 61m, 61c, 61k, that is, inside the convey belt 21. In addition, an exposure point by an exposure device 50 (to be described later) is formed on that portion of the outer peripheral surface of each photosensitive drum 61y, 61m, 61c, 61k, which lies between the charging device 62y, 62m, 62c, 62k and the developing roller 64y, 64m, 64c, 64k.

Sheet cassettes 22a, 22b containing paper sheets P as image formation media, on which images formed by the image forming units 10y, 10m, 10c, 10k are to be transferred, are disposed below the convey mechanism 20.

A pick-up roller 23a, 23b is disposed at one end of each of the sheet cassettes 22a, 22b and on a side close to the driven roller 92. The pick-up roller 23a, 23b picks up sheets P one by one from the uppermost one from the sheet cassette 22a, 22b. Register rollers 24 are disposed between the pickup rollers 23a, 23b and the driven roller 92. The register rollers 24 register and align a leading edge of the sheet P picked up from the sheet cassette 22a, 22b with a leading edge of a y-toner image formed on the photosensitive drum 61y of the image forming unit 10y.

Toner images formed on the other photosensitive drums 61y, 61m and 61c are brought to respective transfer positions in accordance with the transfer timing of the sheet P conveyed on the convey belt 21.

An attraction roller 26 for providing an electrostatic attraction force to the sheet P conveyed at the predetermined timing via the register rollers 24 is disposed between the register rollers 24 and the first image forming unit 10y, and near the driven roller 92, that is, substantially over the outer peripheral surface of the driven roller 92 with the convey belt 21 interposed. The axis of the attraction roller 26 and the axis of the driven roller 92 are set to be parallel to each other.

A position error sensor 96 for sensing a position of the image formed on the sheet P on the convey belt 21 is disposed in a region at one end of the convey belt 21, and near the driving roller 91, that is, substantially over the outer peripheral surface of the driving roller 91 with the convey belt 21 interposed. The position error sensor 96 comprises, for example, a light transmission type or a light reflection type optical sensor.

A convey belt cleaning device 95 for removing toner adhering to the convey belt 21 or paper dust of the sheet P is disposed at the outer peripheral surface of the driving roller 91, in contact with the convey belt 21 on the downstream side of the position error sensor 96.

A fixing device 80 is disposed in a region to which the sheet P conveyed by the convey belt 21 and separated from the driving roller 91 is delivered. The fixing device 80 heats the sheet P at a predetermined temperature, melts the toner image transferred on the sheet P, and fixes the toner image on the sheet P. The fixing device 80 comprises a heat roller pair 81, oil apply rollers 82 and 83, a web winding roller 84, a web roller 85, and a web press roller 86. The toner on the sheet P is fixed and the sheet P with the fixed toner image is discharged by a discharge roller pair 87.

The exposure device 50 forms color-separated electrostatic latent images on outer peripheral surfaces of the respective photosensitive drums 61y, 61m, 61c and 61k. The exposure device 50 has a semiconductor laser 60. The light emission from the semiconductor laser 60 is controlled on the basis of image data (y, m, c, k) of respective colors separated by an image processing apparatus 36 (to be described below). A polygon mirror 51 rotated by a polygon motor 54 to reflect and scan laser beams and fθ lenses 52 and 53 for focusing the laser beams reflected by the polygon mirror 51 by correcting their focal points are disposed in the named order along the optical path of the semiconductor laser 60.

First deflection mirrors 55y, 55m, 55c and 55k for deflecting the respective color laser beams emanating from the fθ lens 53 toward the exposure points on the photosensitive drums 61y, 61m, 61c and 61k, and second and third deflection mirrors 56y, 56m, 56c, 57y, 57m and 57c for further deflecting the laser beams deflected by the first deflection mirrors 55y, 55m and 55c are disposed between the fθ lens 53 and the photosensitive drums 61y, 61m, 61c and 61k.

The laser beam for black is deflected by the first deflection mirror 55k and then directly guided to the photosensitive drum 61k without intervention of other mirrors.

Figure 2:
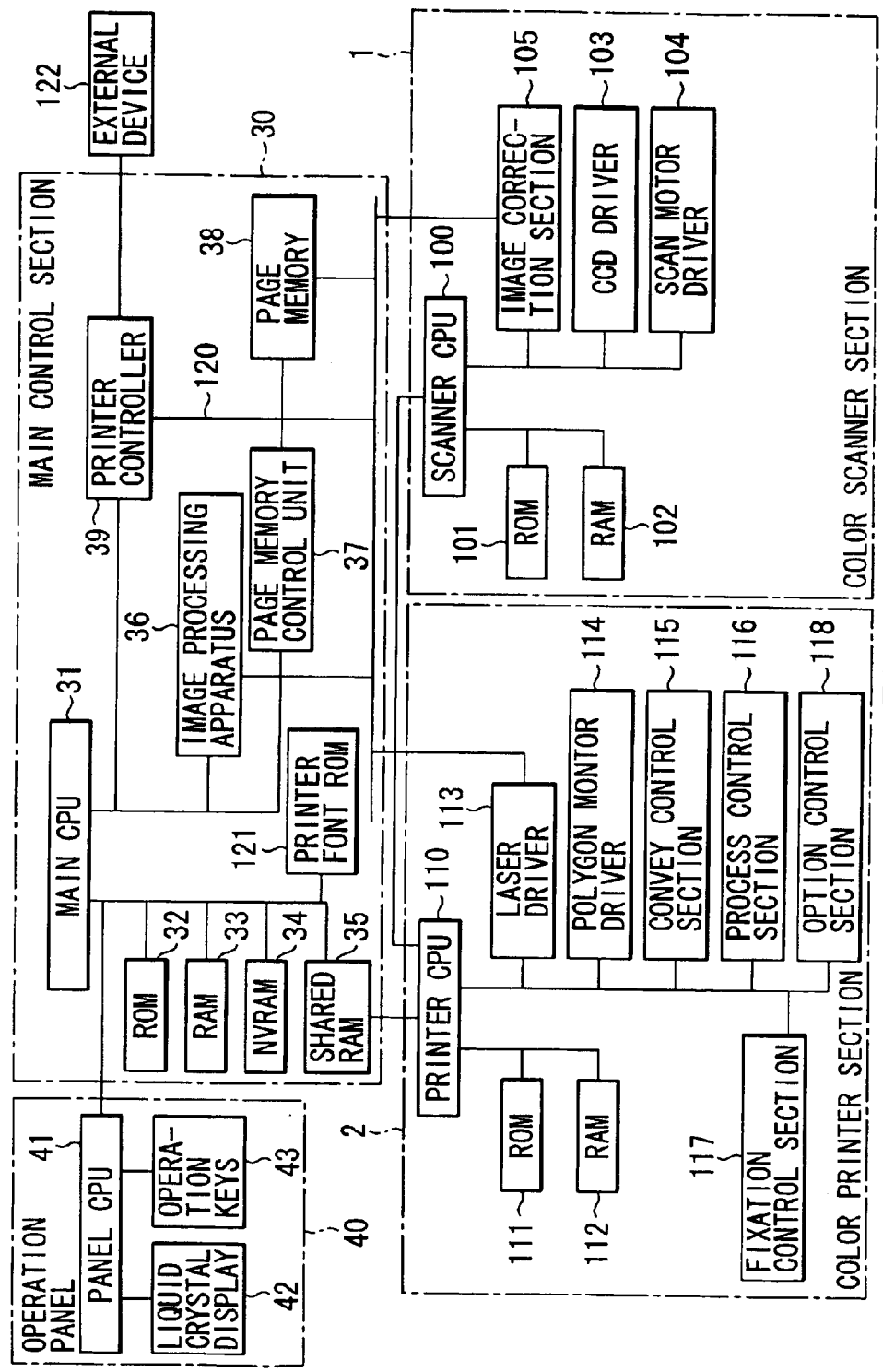
FIG. 2 is a block diagram schematically showing electrical connections and the flow of signals for control in the digital copying machine shown in FIG. 1.

FIG. 2 is a block diagram schematically showing electrical connection of the digital copying machine shown in FIG. 1 and flow of signals for control. In FIG. 2, a control system comprises three CPUs (Central Processing Units): a main CPU 31 provided in a main control section 30; a scanner CPU 100 in the color scanner section 1; and a color printer CPU 110 in the color printer section 2.

The main CPU 31 performs bi-directional communication with the printer CPU 110 via a shared RAM (Random Access Memory) 35. The main CPU 31 issues an operational instruction, and the printer CPU 110 returns status data. Serial communication is performed between the printer CPU 110 and scanner CPU 100. The printer CPU 110 issues an operational instruction, and the scanner CPU 100 returns status data.

An operation panel 40 comprises a liquid crystal display 42, various operation keys 43 and a panel CPU 41 to which these are connected. The operation panel 40 is connected to the main CPU 31.

The main control section 30 comprises the main CPU 31, a ROM (Read-Only Memory) 32, a RAM 33, an NVM 34, shared RAM 35, image processing unit 36, a page memory control unit 37, a page memory 38, a printer controller 39, and a printer font ROM 121.

The main CPU 31 controls the entirety of the main control section 30. The ROM 32 stores control programs, etc. The RAM 33 temporarily stores data.

The NVM (Non-Volatile RAM) 34 is a non-volatile memory backed up by a battery (not shown), and even when power is not supplied, stored data is maintained.

The shared RAM 35 is used to perform bi-directional communication between the main CPU 31 and printer CPU 110.

The page memory control unit 37 stores and read out image information in and from the page memory 38. The page memory 38 has areas capable of storing image information of a plurality of pages. The page memory 38 can store compressed data in units of a page, which is obtained by compressing image information from the color scanner section 1.

The printer font ROM 121 stores font data corresponding to print data. The printer controller 39 develops print data, which is sent from an external device 122 such as a personal computer, into image data using the font data stored in the printer font ROM 121 with a resolution corresponding to resolution data added to the print data.

The color scanner section 1 comprises the scanner CPU 100 for controlling the entirety of the color scanner section 1; a ROM 101 storing control programs, etc.; a data storage RAM 102; a CCD driver 103 for driving the color image sensor 15; a scan motor driver 104 for controlling the rotation of a scan motor for moving the first carriage 8, etc.; and an image correction section 105.

The image correction section 105 comprises an A/D converter for converting R-, G- and B-analog signals output from the color image sensor 15 to digital signals; a shading correction circuit for correcting a variance in the color image sensor 15 or a variation in threshold level due to ambient temperature variation relative to the output signal from the color image sensor 15; and a line memory for temporarily storing shading-corrected digital signals from the shading correction circuit.

The color printer section 2 comprises the printer CPU 110 for controlling the entirety of the color printer section 2; a ROM 111 storing control programs, etc.; a data storage RAM 112; a laser driver 113 for driving the semiconductor laser 60; a polygon motor driver 114 for driving the polygon motor 54 of the exposure device 50; a convey control section 115 for controlling conveyance of the sheet P by the convey mechanism 20; a process control section 116 for controlling charging, developing and transferring processes using the charging device, developing roller and transfer device; a fixation control section 117 for controlling the fixing device 80; and an option control section 118 for control options.

The image processing unit 36, page memory 38, printer controller 39, image correction section 105 and laser driver 113 are connected over an image data bus 120.

Figure 3:
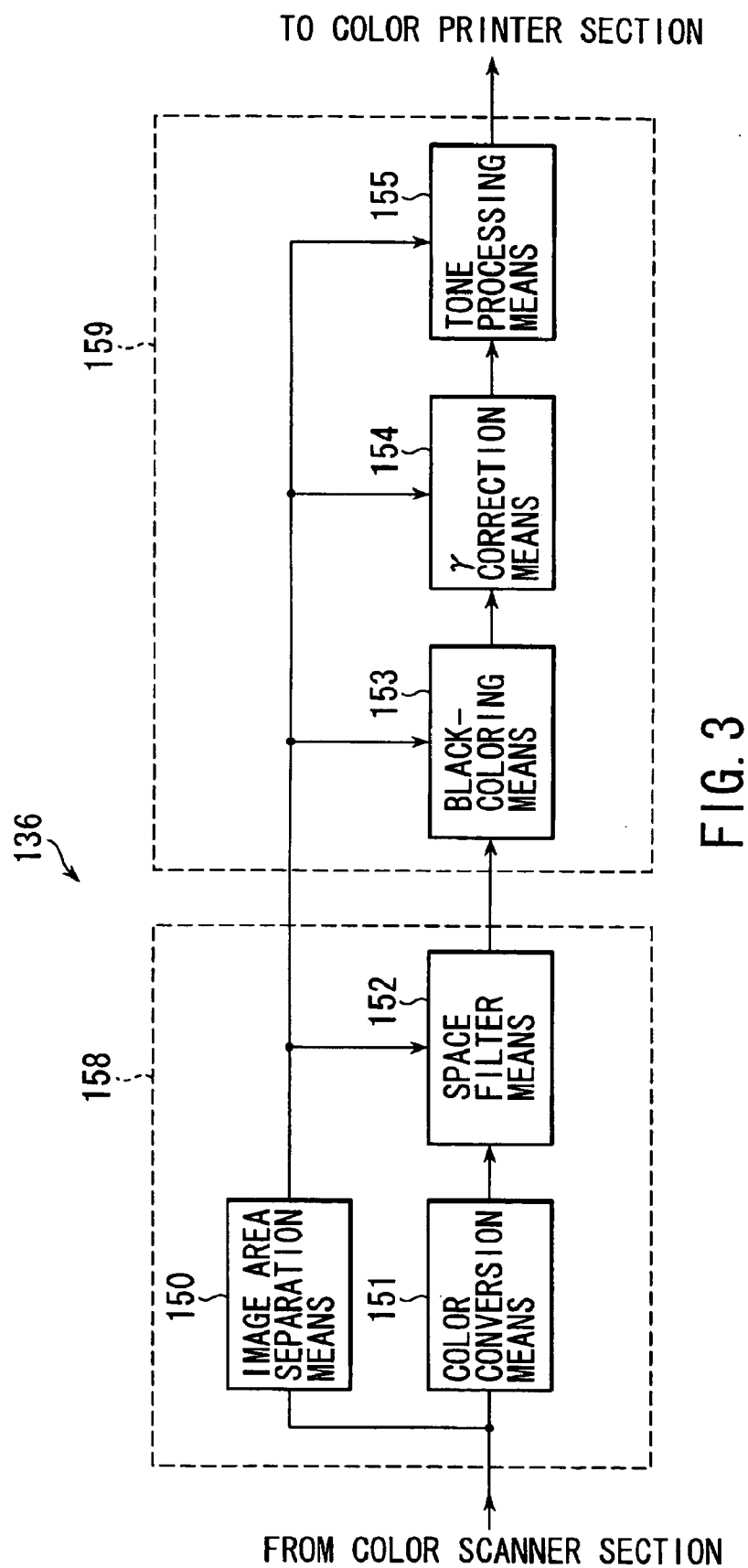
FIG. 3 schematically shows the structure of a conventional image processing apparatus.
Figure 4:
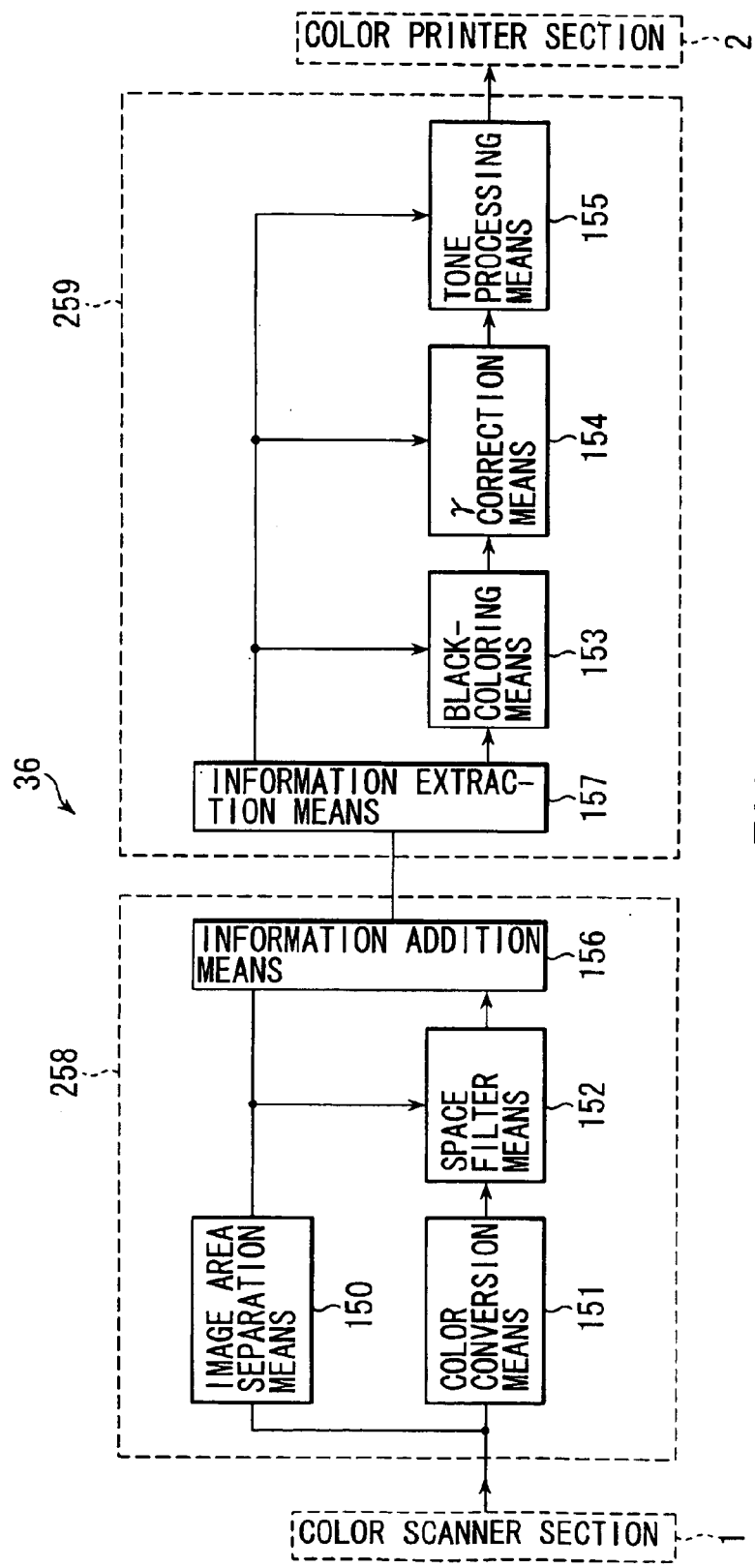
FIG. 4 is a block diagram schematically showing the structure of an image processing apparatus according to the present invention.

FIGS. 3 and 4 are views for explaining differences between the prior-art structure and the structure of the present invention in the image processing apparatus.

FIG. 3 schematically shows the structure of a conventional image processing apparatus 136. To start with, an image is input by image reading means (not shown), such as a scanner or a digital camera, and RGB image data is output to the image processing apparatus 136.

In the image processing apparatus 136, color conversion means 151 converts the input RGB image data to CMY color signals. On the other hand, image area separation means 150 discriminates whether an object image is a character or a photograph, on the basis of the input RGB signals. Space filter means 152 performs a filtering process on the basis of the information discriminated by the image area separation means 150. Black-coloring means 153 generates a K signal from CMY signals and produces CMYK signals.

In this case, if the discrimination result of the image area separation means 150 is a character, the amount of K is increased. A γ correction means 154 corrects tone characteristics of image forming means (not shown) such as a printer. In this case, too, if the discrimination result of the image area separation means 150 is a character, characteristics are converted so as to increase the contrast. Tone processing means 155 performs, for example, an error spread process in accordance with the number of recordable bits of the output apparatus.

As has been described above, each process means of the image processing apparatus 136 is realized by hardware. For example, the three processes of the image area separation means 150, color conversion means 151 and space filter means 152 are constituted by one ASIC (application specific integrated circuit) 158. The three processes of the black-coloring means 153, γ correction means 154 and tone processing means 155 constituted by another ASIC 159. Thus, the process means are realized by the two ASICs.

Accordingly, the two ASICs 158 and 159 need to be connected with 24 bits (8 bits for each color image signal) and 3 bits (1 bit for each-color discrimination signal). That is, a 9-bit (8 bits+1 bit) image signal is needed for each color.

On the other hand, FIG. 4 schematically shows the structure of the image processing apparatus of the present invention. Although the structure of the image processing apparatus 36 of this invention is substantially the same as that of the above-described conventional image processing apparatus 136, the structure of the connection portions of the two ASICs is different. The common parts are denoted by like reference numerals and a description thereof is omitted.

Specifically, the image processing apparatus 36 comprises an ASIC 258 and an ASIC 259. The ASIC 258 comprises the image area separation means 150, color conversion means 151, space filter means 152 and information addition means 156. The ASIC 259 comprises the black-coloring means 153, γ correction means 154, tone processing means 155 and information extraction means 157.

The information addition means 156 provided at an output stage of the ASIC 258 outputs an 8-bit signal for each color, which is composed of an 8-bit image signal and a 1-bit discrimination signal. The information extraction means 157 is provided at an input stage of the ASIC 259. The information extraction means 157 extracts an 8-bit image signal for each color and 1-bit discrimination signal from the input 8-bit information, and delivers them to the respective process means in the subsequent stages.

In brief, the two ASICs in the image processing apparatus 36 of this invention are connected by the 8-bit signal for each color.

The structure of the present invention will now be described in greater detail with reference to FIG. 4.

To start with, the color scanner section 1 comprising, for example, a color CCD scanner, reads a color image on an original document and converts it to electric signals indicative of 8-bit digital data of the three primary colors R (red), G (green) and B (blue), respectively, for each of unit pixels (e.g. 400 dpi) arranged in a matrix. The converted signals are delivered to the image processing apparatus 36 as RGB signals.

In the image processing apparatus 36, the color conversion means 151 converts the respective RGB signals input from the color scanner section 1 to signals of C (cyan), M (magenta) and Y (yellow) corresponding to signals for the color printer section 2. The conversion is based on the following equations:

$$Dr=-logR$$
$$Dg=-logG$$
$$Db=-logB$$

$$\begin{pmatrix} C \\ M \\ Y \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} Dr \\ Dg \\ Db \end{pmatrix}$$

Figure 5:
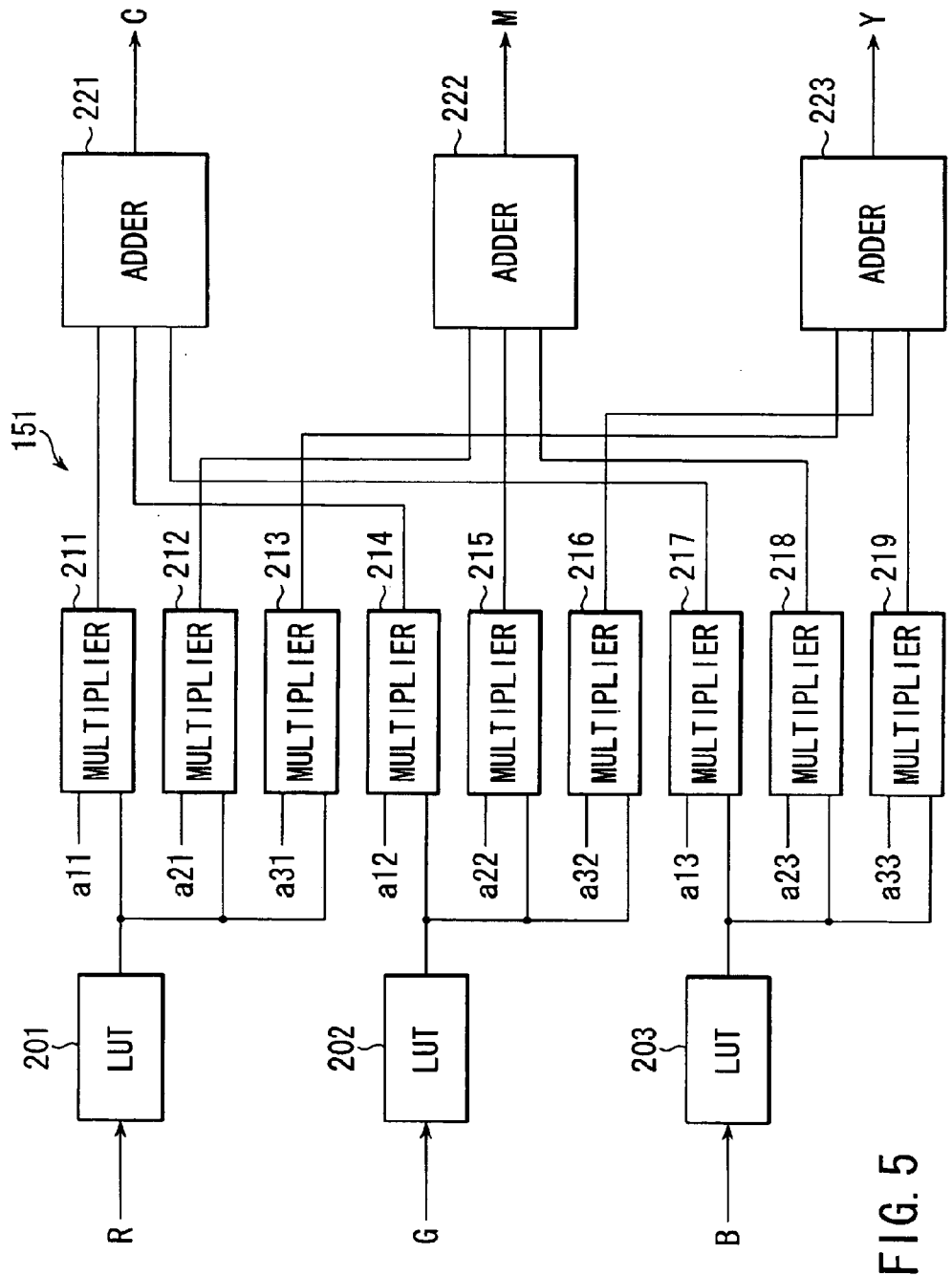
FIG. 5 shows an example of a circuit structure of color conversion means.

FIG. 5 shows an example of the circuit structure of the color conversion means 151 for performing the above arithmetic operations. The color conversion means 151 comprises lookup tables (LUT) 201–203, multipliers 211–219 and adders 221–223. The lookup tables 201–203 perform log conversion, and the nine multipliers 211–219 and three adders 221–223 perform 3×3 matrix arithmetic operations.

Figures 6, 7:
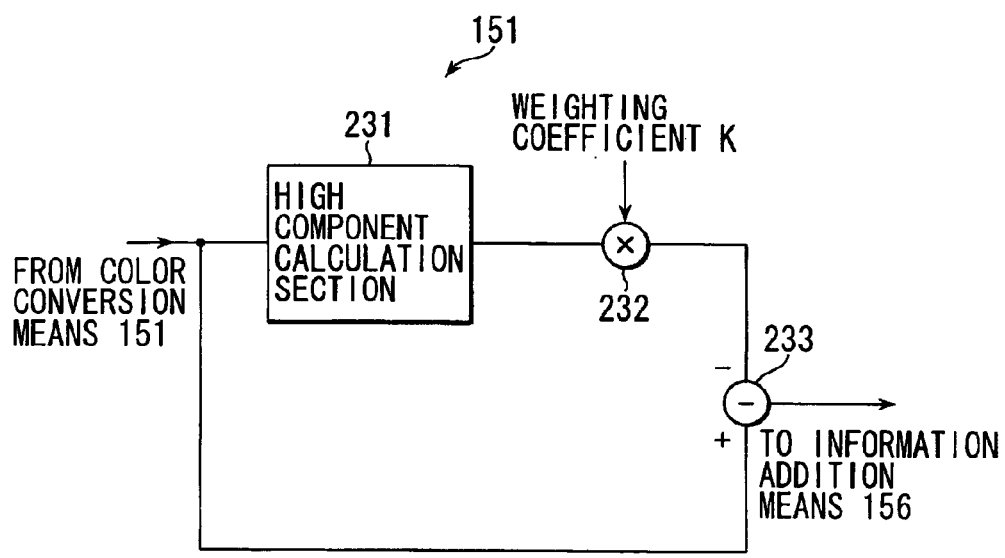
FIG. 6 shows an example of the structure of space filter means.
FIG. 7 shows an example of a filter.

FIG. 6 shows an example of the structure of the space filter means 152. The space filter 152 comprises a high component calculation section 231, a multiplier 232 for calculating a weight of the high component, and a subtracter 233 for subtraction from the original image.

The high component calculation section 231 comprises a filter as shown in FIG. 7 and emphasizes a high component of the original image by calculations of, e.g. 3×3 Laplacian filter.

Figure 8:
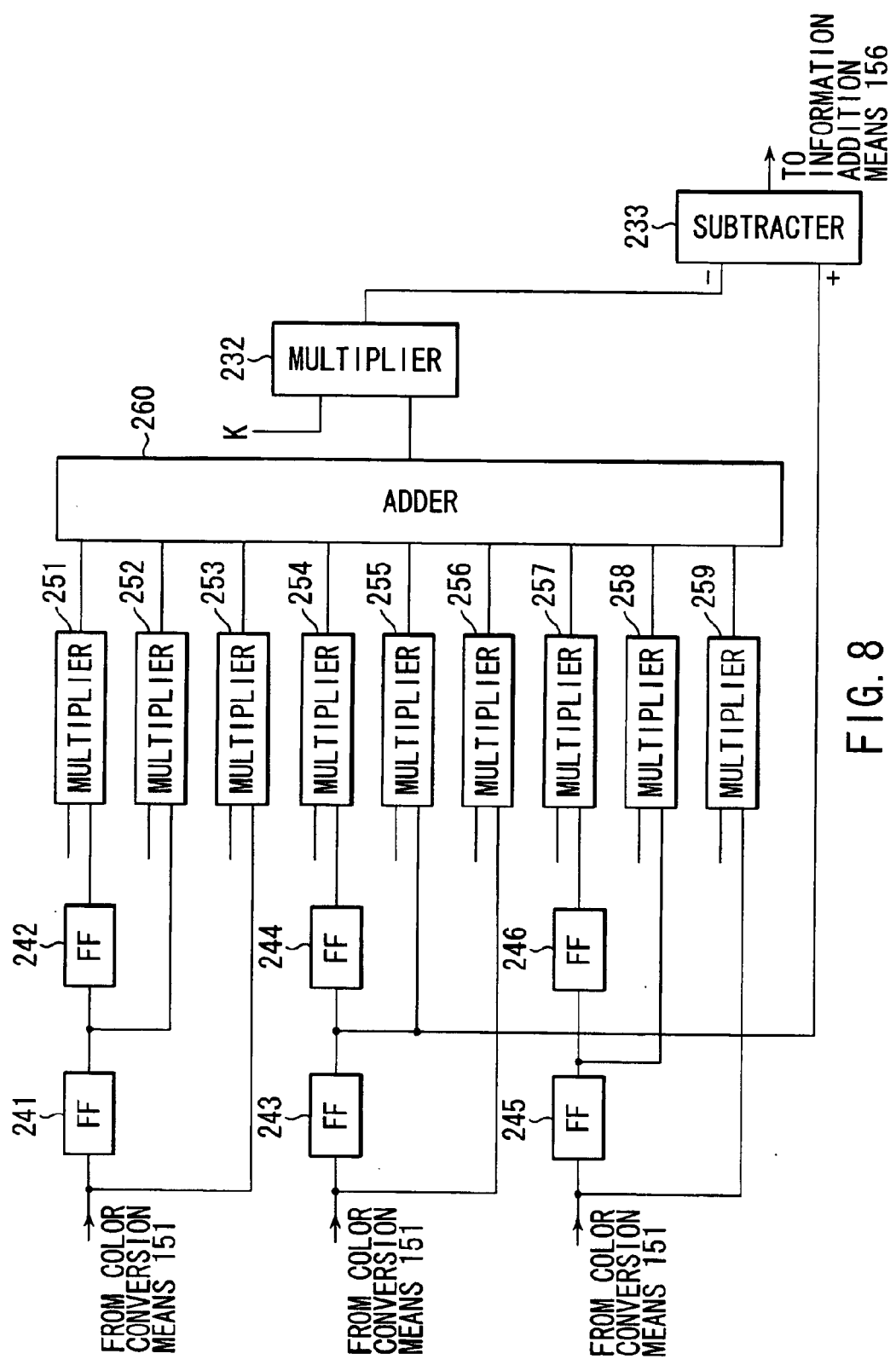
FIG. 8 shows a specific example of the circuit structure of the space filter means.

FIG. 8 shows an example of the specific circuit structure of the space filter means. Specifically, the space filter means 152 comprises flip-flop circuits 241–246, multipliers 251–259, an adder 260, a multiplier 232 and a subtracter 233.

The above circuit needs to be provided for each of the colors C, M and Y. In this case, a weighting coefficient K is controlled on the basis of the discrimination result of the image area separation means 150. If the discrimination result indicates a character, the weighting coefficient takes a relatively high value. If the discrimination result indicates a photograph, the weighting coefficient takes a relatively low value.

Figure 9:
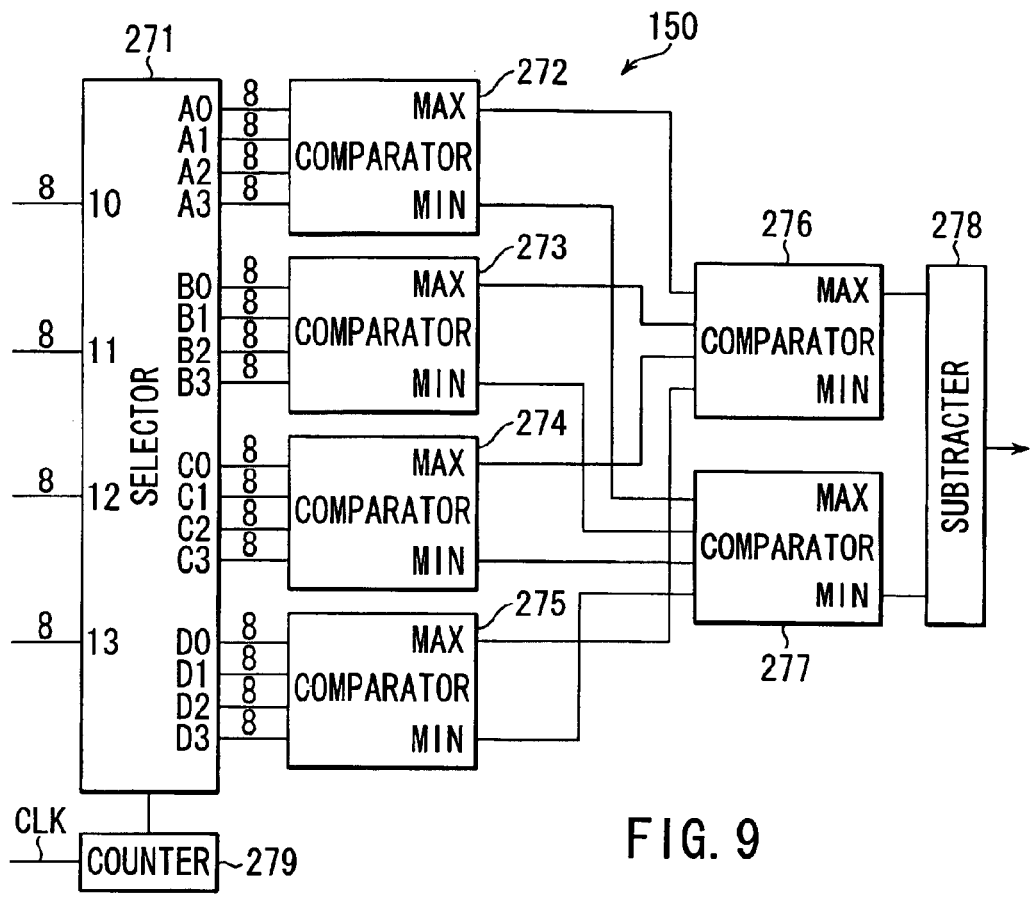
FIG. 9 shows an example of the structure of image area separation means.
Figure 10:
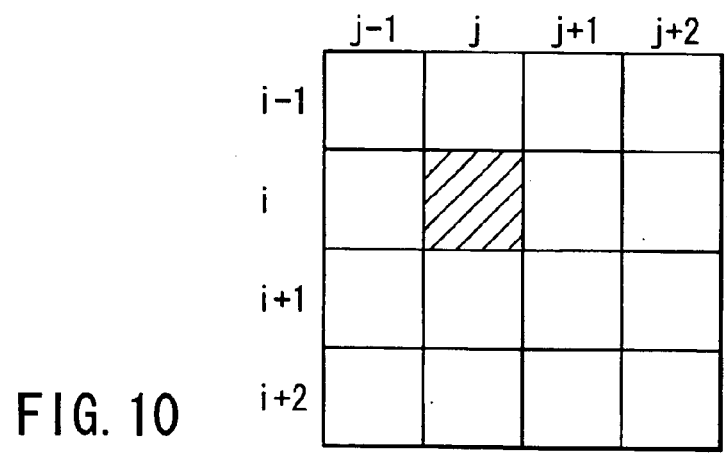
FIG. 10 shows a window of (4×4) pixels including a pixel of interest.

FIG. 9 shows an example of the structure of the image area separation means 150. Specifically, the image area separation means 150 comprises a selector 271, comparators 272–277, a subtracter 278 and a counter 279. A (4×4) pixel window (a target pixel indicated by hatching) including a target pixel, as shown in FIG. 10, is referred to, and a difference between a maximum density value and a minimum density value in the window is calculated as a maximum density difference. Using the maximum density difference, the target pixel is discriminated between a character and a photograph. If the maximum density in the window is Dmax, the minimum density is Dmin and maximum density difference is $\Delta$Dmax, $$\Delta Dmax = Dmax - Dmin.$$

From this, the maximum density difference $\Delta$Dmax is calculated. The principle of discrimination is based on the feature that the character portion has a great density variation in a local region and the photograph has a gentle density variation. In other words, using a statistically determined threshold Th, the following determination is effected:

$\Delta$Dmax$\geq$Th: Character $\Delta$Dmax<Th: Photograph.

Thus, a 1-bit discrimination signal is output. Where the discrimination result indicates the character, for instance, a signal with value "1" is output. Where the discrimination result indicates the photograph, a signal with value "0" is output.

In the above example, the discrimination signal is the 1-bit signal. However, a 2-bit signal may be output to produce three kinds of signals indicative of a character, a photograph and a dot patter. In order to discriminate more kinds of areas, signals of more than two bits may be output.

A method to be described below by way of example is a method for separating three areas of a character, a photograph and a dot-pattern photograph. This is a "Block Separate Transformation Method: BSET method) disclosed in "DOT-PATTERN PHOTOGRAPH DISCRIMINATION METHOD" (the IEICE (Institute of Electronics, Information and Communication Engineers) Transactions, 87/2 vol. J70.B No. 2).

In this method, a target image is divided into blocks, and three areas are separated by a density variation in each block. In this case, the following features of the density variation are used:

a. A photograph has a small density variation in the block, b. A character and a dot-pattern photograph have a great density variation in blocks, c. A character has a long cycle of density variation, and d. A dot-pattern photograph has a short cycle of density variation.

The method will now be describe in detail.

(1) A target pixel is divided into blocks each comprising (m×n) pixel.

(2) A maximum density signal Dmax and a minimum density signal Dmin in the block are found, and an intra-block maximum density difference signal $\Delta$Dmax is calculated.

(3) The signal $\Delta$Dmax is compared with a predetermined threshold Th1, and a photograph area and a non-photograph area (a character area and a dot-pattern photograph area) are separated under the conditions:

$\Delta$Dmax$\leq$Th: Photograph area $\Delta$Dmax>Th: Non-photograph area.

(4) Each pixel in the block is digitized (0 or 1) on the basis of an average signal Da of intra-block signals.

(5) The number of times of changes, Kh, of "0" and "1" in intra-block successive pixels in the main scan direction is found. Similarly, the number of times of changes, Kv, in the sub-scan direction is found.

(6) The values Kh and Kv are compared with a predetermined threshold Th2, the character area and dot-pattern photograph area are separated under the following conditions:

Kh$\geq$Th2 and Kv$\geq$Th2 . . . dot-pattern photograph area

Kh<Th2 or Kv<Th2 . . . character area.

Through the above procedure, the character area, photograph area and dot-pattern photograph area can be separated.

Subsequently, the information addition means 156 according to the present invention adds additional information to the 8-bit image signal of each color, and outputs 8-bit information. A description will now be given of the case where the additional information has a 3-bit format.

A first embodiment of the present invention will now be described.

Figure 11:
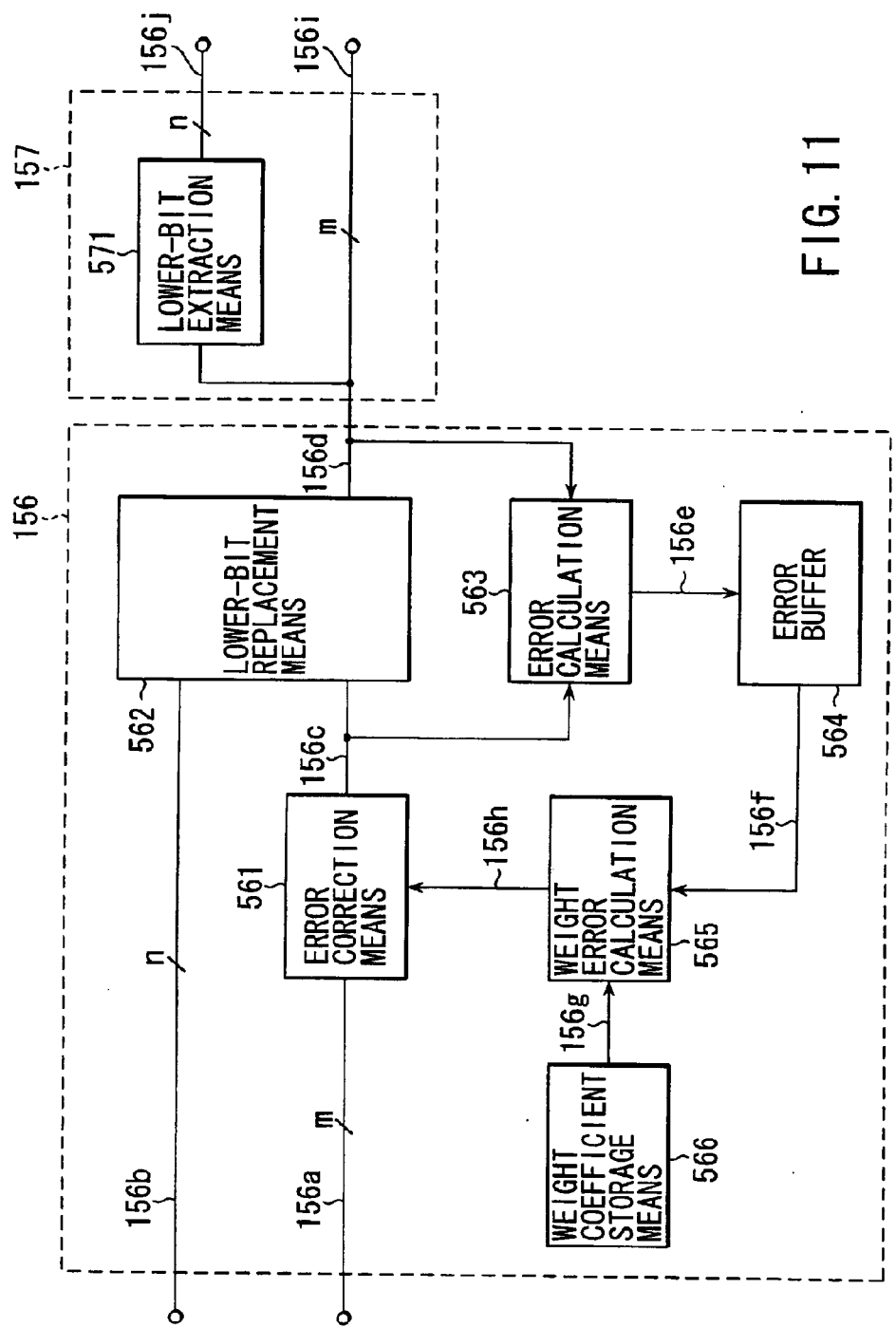
FIG. 11 is a block diagram showing the structures of information addition means and information extraction means according to a first embodiment of the invention.

FIG. 11 shows the structures of the information addition means 156 and information extraction means 157 in the first embodiment.

In the information addition means 156 shown in FIG. 11, reference numeral 156a denotes an m-bit image signal; 156b n-bit addition information; 561 error correction means for correcting image information of a target pixel; 156c a correction image signal; 562 lower-bit replacement means; 156d conversion image signal; 563 error calculation means for calculating an error between the conversion image signal 156d output from the lower-bit replacement means and the correction image signal 156c; 156e an error signal; 564 an error buffer storing the error signal 156e; 156f an error signal; 566 weight coefficient storage means for storing a weight coefficient for calculating a weight error; 565 weight error calculation means for calculating a weight error by multiplying the error signal 156f by a weight coefficient 156g of the weight coefficient storage means 566.

The information extraction means 157 shown in FIG. 11 receives the conversion image signal 156d from the information addition means 156 and outputs an m-bit image signal 156i. The information extraction means 157 has a lower-bit extraction means 571 which extracts lower bits from the input conversion image signal 156d and outputs n-bit addition information 156j.

The information addition process in the information addition means 156 will now be described in detail. Assume that the image signal 156a is an m=8 (bit) signal and the addition information 156b is an n=3 (bit) image area separation signal.

The image signal 156a output from the space filter means 152 is input to the error correction means 561. The error correction means 561 performs a correction process based on the weight error signal 156h (to be described later) and outputs the correction image signal 156c. The correction image signal 156c and the image area separation signal 156b output from the image area separation means 150 are input to the lower-bit replacement means 562. The lower-bit replacement means 152 replaces the lower 3 bits of the 8-bit image signal 156a with the three bits of the image area separation signal 156b and outputs the conversion image signal 156d.

Figure 12:
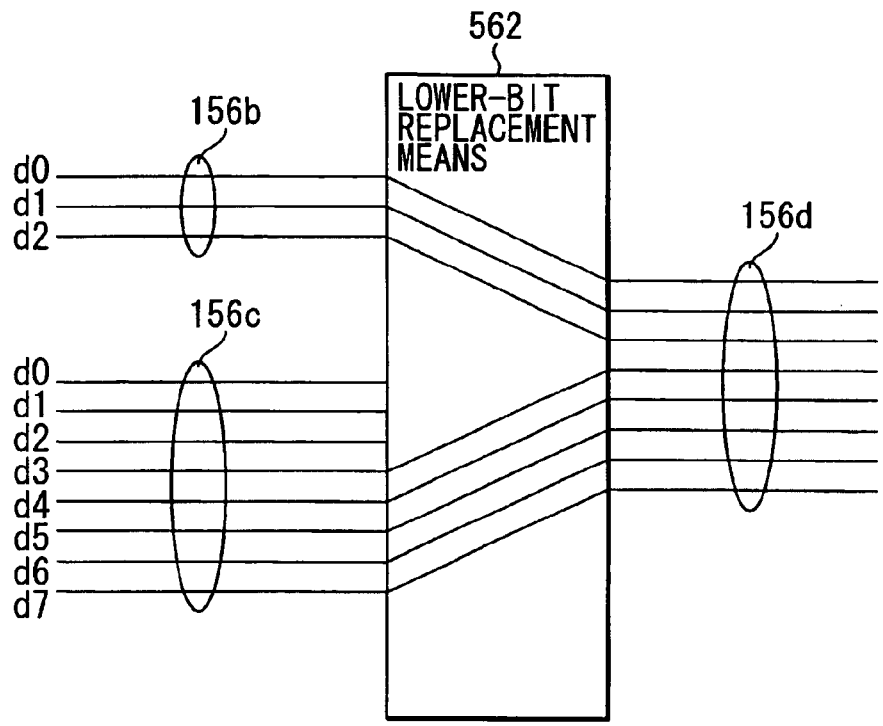
FIG. 12 shows a specific method for replacing 3 bits by lower-bit replacement means.

FIG. 12 illustrates a specific method of replacing the 3 bits in the lower-bit replacement means 562. In FIG. 12, the lower-bit replacement means 562 performs a process of replacing the lower bits b0–b2 of the 8 bits b0–b7 of the image signal 156a with the 3 bits d0–d2 of the image area separation signal 156b, and outputs the 8-bit conversion image signal 156d.

The 8-bit conversion image signal 156d subjected to the replacement process is input to the lower-bit extraction means 57 of the information extraction means 157.

On the other hand, the error calculation means 563 calculates an error between the correction image signal 156c and the conversion image signal 156d, and delivers the obtained error signal 156e to the error buffer 564. The error buffer 564 stores the error signal 156e calculated by the error calculation means 563. Where the weight error calculation (to be described later) is performed using a filter shown in FIG. 13, a line memory for one line is required. The error buffer 564 outputs the error signals 156f for four pixels to the weight error calculation means 565.

Figure 13:
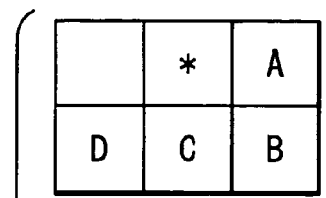
FIG. 13 is a view for explaining an error filter.

The weight error calculation means 565 calculates the weight error signals 156h obtained by multiplying the four-pixel error signals 156f by the weight coefficients 156g (A, B, C and D (A=7/16, B=1/16, C=5/16, and D=3/16). As is shown in FIG. 13, the coefficients stored in the weight coefficient storage means 566 correspond to four pixels disposed around the target pixel indicated by mark (*). The error of each pixel is multiplied by the weight coefficient A, B, C, D to calculate weight errors, and the weight errors are added. By this procedure, the weight error signal 156h is calculated.

The additional information (image area separation signal) is added by the above-described procedure, and thus the additional information is surely added to the lower bits of the image signal. Moreover, since the error due to the addition of information is compensated by an error spread method, the tone curve of the output image signal is not degraded. In short, information is added to the 8-bit image signal.

Figure 14:
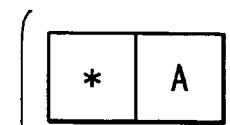
FIG. 14 is a view for explaining an error filter.

In the above description, the error filter (coefficients) shown in FIG. 13 is used in the calculation of weight errors. However, an error filter shown in FIG. 14 may be used. In this case, the error buffer 564 is dispensed with. Accordingly, the line memory is not needed and the calculation of the weight error calculation is simplified.

The ASIC 258 is constituted by the image area separation means 150, color conversion means 151, space filter means 152 and information addition means 156. The ASIC 258 outputs the 8-bit signal for each color.

The information extraction means 157 extracts n-bit additional information from the conversion image signal 156d. The lower-bit extraction means 571 extracts the lower 3 bits of the 8-bit conversion image signal 156d of each color, and outputs the image area separation signal 156j as additional information. In this method, the image area separation signal 156j representing the additional information is completely equal to the image area separation signal 156b representing the additional information, which is output from the image area separation means 150. On the other hand, as regards the image information, the conversion image signal 156d input to the information extraction means 157 is directly output as the image signal 156i.

As has been described above, the additional information (image area separation signal) can be exactly extracted from the lower bits of the image signal (conversion image signal). Moreover, since the error due to the addition of information is compensated by the error spread method, the tone curve of the output image signal is not degraded.

The black-coloring means 153 shown in FIG. 3 performs a process of producing C (cyan), M (magenta), Y (yellow) and K (black) signals from the C (cyan), M (magenta) and Y (yellow) signals. For example, this process is carried out by a UCR process represented by the equations shown below $K = a \times \min(C, M, Y)$ $C' = C - K$ $M' = M - K$ $Y' = Y - K$ a: parameter determining the amount of black.

Figure 15:
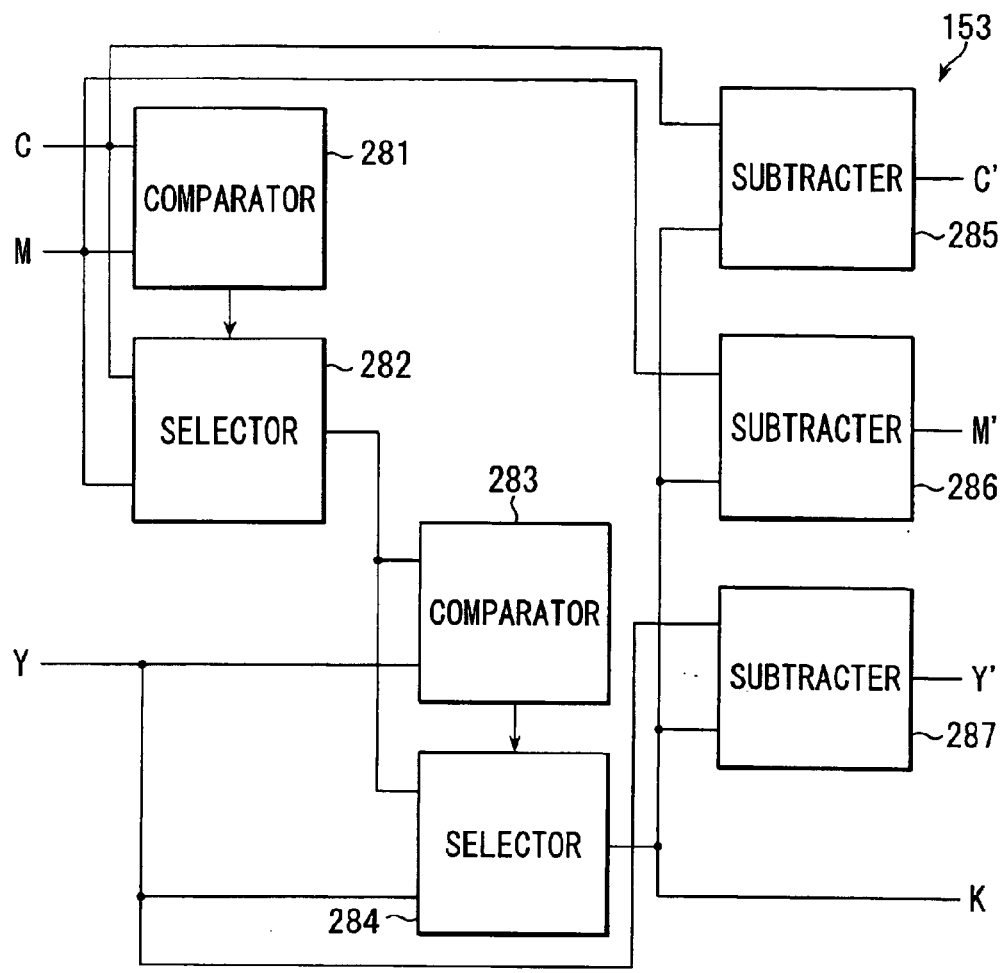
FIG. 15 shows a circuit structure of black-coloring means.

This arithmetic operation is realized by the circuit structure shown in, e.g. FIG. 15. Specifically, the black-coloring means 153 comprises comparators 281 and 283, selectors 282 and 284, and subtracters 285–287.

In an example of a page discrimination use method in the black-coloring means, the black radio a is varied for each kind of image. In the case of a uniform background or a dot-pattern background on which a character is present, the black ratio a is increased so that the character in black may easily be reproduced with a single color of black. Thus the reproducibility of the character is enhanced. In the case of a dot-pattern photograph or a continuous photograph, the black ratio a is decreased so that emphasis may be put on color reproduction.

Figure 16:
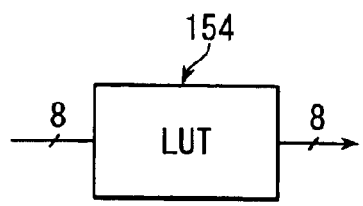
FIG. 16 is a view for explaining y-correction means.
Figure 17:
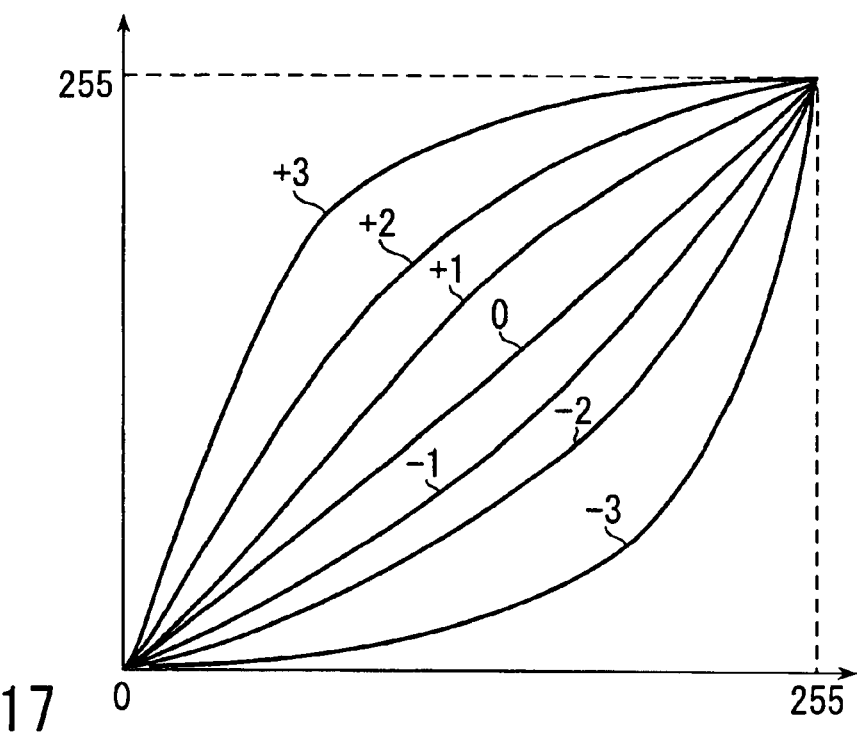
FIG. 17 shows density conversion curves set on a table.

The γ correction means 154 shown in FIG. 3 corrects color density characteristics of CMY for the color printer section 2. The γ correction means 154 is a block used by the user when the density is adjusted. FIG. 16 shows a simplest structure of the γ correction means 154, which is an LUT (lookup table) with an 8-bit input and an 8-bit output. For example, density conversion curves as shown in FIG. 17 are set on the lookup table. A curve of 0 (input and output being equal) is set as a default. If the user adjusts the density, density curves corresponding to −3 to +3 are set in accordance with the determined image quality parameter.

Depending on the discrimination information of the image area separation means 150, the γ correction means 154 may adopt the following setting method. For example, in the case of a uniform background or a dot-pattern background on which a character is present, a high γ table including a γ curve is prepared and set for γ correction. Thereby, the reproducibility of character is enhanced. On the other hand, in the case of a dot-pattern photograph or a continuous photograph, a table with linear input/output is set so that emphasis may be put on tone curve reproducibility.

The tone processing means 155 shown in FIG. 3 performs a process for converting 8-bit CMYK signals to, e.g. 1-bit (2-value) signals. A typical method is "error spread method". In the "error spread method", the density of a target pixel is combined with a value obtained by multiplying already digitized two-value errors of peripheral pixels with weight coefficients. The digitizing process is carried out with a fixed threshold.

Figure 18:
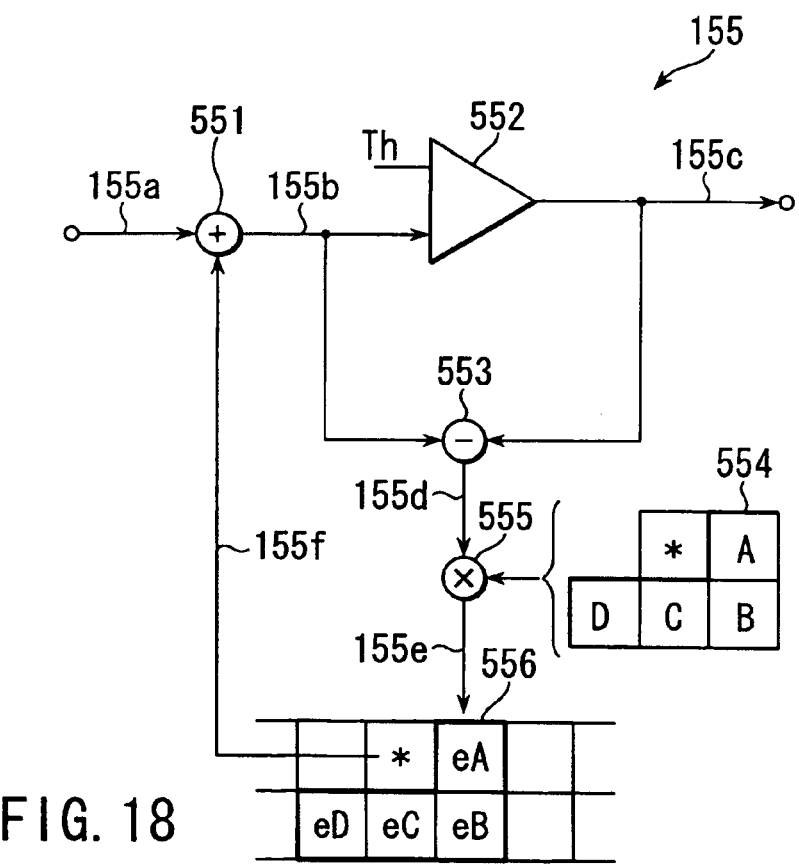
FIG. 18 shows a structure for a digitizing process using an error spread method.

FIG. 18 is a block diagram showing the structure for carrying out the digitizing process using "error spread method." In FIG. 1B, numeral 155a denotes an input image signal; 551 correction means for correcting image information of the target pixel; 155b a correction image signal; 552 digitizing means for digitizing the corrected image information of the target pixel; 155c a digital image signal; 553 digitizing error calculation means for calculating a digitized error of the digitized target pixel; 155d a digital error signal; 544 weight coefficient storage means for storing weight coefficients for calculating weight errors; 555 weight error calculation means for calculating a weight error by multiplying the digitized error calculated by the digitizing error calculation means 553 by the weight coefficient stored in the weight coefficient storage means 554; 155e a weight error signal; 556 error storage means for storing a weight error calculated by the weight error calculation means; and 155f an image correction signal.

The digitizing process using the "error spread method" will now be described in detail.

The input signal 155a is input to the correction means 551. The correction means 551 corrects the input signal 155a on the basis of the image correction signal 155f (to be described later) and delivers the correction image signal 155*b* to the digitizing means 552 and digitizing error calculation means 553. The digitizing means 552 compares the input correction image signal 155*b* with a digitizing threshold Th (e.g., 80 h: h means hex. (hexadecimal)). If the correction image signal 155*b* is greater than the digitizing threshold Th, the digitizing means 552 outputs "1" (black pixel) as the digital image signal. If not, the digitizing means 552 outputs "0" (white pixel).

The digitizing error calculation means 553 calculates an error between the correction image signal 155*b* and digital image signal 155*c* (0h if the digital image signal is "0"; ffh if the digital image signal is "1"). The calculated error is output to the weight error calculation means 555 as the digital error signal 155*d*. The weight error calculation means 555 calculates the weight error signal 155*e* by multiplying the digital error signal 155*d* by the weight coefficients A, B, C and D (A=7/16, B=1/16, C=5/16, and D=3/16) stored in the weight coefficient storage means 554, and outputs the calculated weight error signal 155*e* to the error storage means 556. In the weight coefficient storage means 554, mark (*) means the target pixel. The digital error of the target pixel is multiplied by coefficients A, B, C and D, and the weight error signals 155*e* of the peripheral four pixels (corresponding to weight coefficients A, B, C and D) of the target pixel are calculated.

The error storage means 556 stores the weight error signals 155*e* calculated by the weight error calculation means 555. The weight errors of the four pixels calculated by the weight error calculation means 555 are added to areas eA, eB, eC and eD in association with the target pixel (*). The above-mentioned image correction signal 155*f* is the signal corresponding to the target pixel (*), representing the accumulated value of the weight errors of the four pixels calculated in the above procedure.

In the description of the tone processing means 155, the output has a digital value. However, if a plurality of digital-value thresholds Th are prepared and compared with the input signal, multi-value tone processing can be performed, as in the case of the digital value.

The tone processing means 155 utilizes, e.g. discrimination information which is output from the image area separation means 150 in the following manner. If the discrimination information output from the image area separation means 150 indicates a photograph, the above-described error spread process is performed. If it indicates a character, the error spread process is not performed. That is, the image correction signal 155*f* is processed as "0".

The ASIC 259 is constituted by the above-described information extraction means 157, black-coloring means 153, γ correction means 154, and tone processing means 155.

The processed C (cyan), M (magenta), Y (yellow) and K (black) signals are input to the color printer section 2 and printed out on a paper sheet.

The above-described first embodiment is an example of the structure of the present invention, and various extensions and modifications can be made without departing from the spirit of the present invention.

A second embodiment of the invention will now be described.

Figure 19:
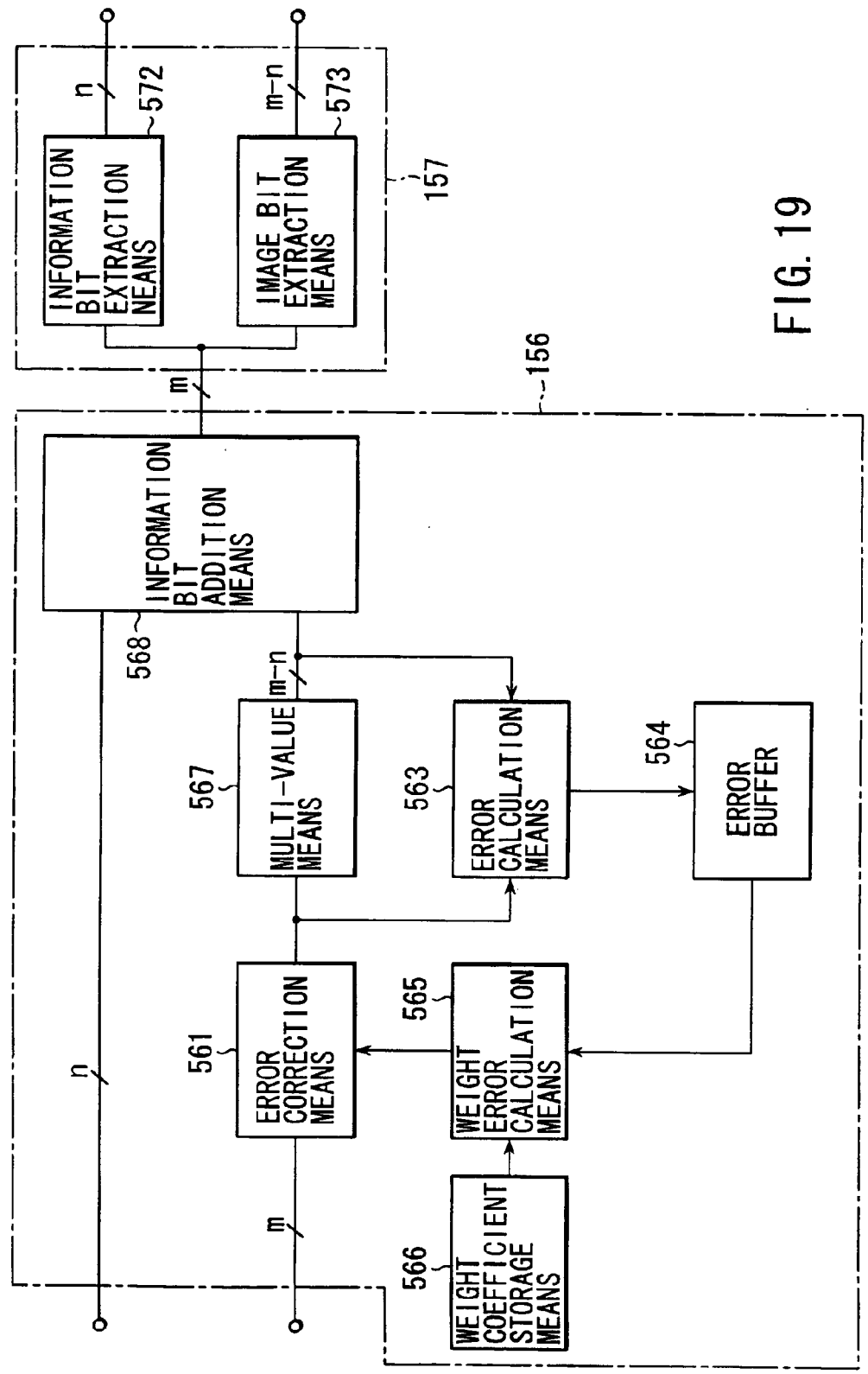
FIG. 19 is a block diagram showing the structures of information addition means and information extraction means according to a second embodiment of the invention.

FIG. 19 shows structures of the information addition means 156 and information extraction means 157 according to the second embodiment. In this embodiment, like the structure shown in FIG. 11, n-bit information is added to an m-bit image signal, but locations of information bit addition means and error calculation means are different. The common parts are denoted by like reference numerals and a description thereof is omitted.

The information addition means 156 comprises error correction means 561, error calculation means 563, error buffer 564, weight error calculation means 565, weight coefficient storage means 566, multi-value means 567, and information bit addition means 568. In the second embodiment, there are provided the multi-value means 567 and the information bit addition means 568 in place of lower-bit replacement means 562.

The information extraction means 157 comprises information bit extraction means 572 and image bit extraction means 573.

In the structure shown in FIG. 19, the information bit addition means 568 is provided outside the loop for calculating the error. Specifically, the number of bits of the m-bit image signal from the error correction means 561 is reduced to m-n bits by the multi-value means 567. Then, the information bit addition means 568 adds information bits of n-bits to the image signal whose number of bits has been reduced to m-n by the multi-value means 567, and the total number of bits is increased to m. In the structure of the second embodiment, the image signal is represented by the upper m-n bits of the m bits of the conversion image signal. That is, the number of bits of the image signal is reduced from m to m-n.

On the other hand, the addition information is obtained by extracting the lower n bits of the m-bit conversion image signal by the information bit extraction means 572. The image signal is obtained by extracting the m-n bits by the image bit extraction means.

A third embodiment of the invention will now be described.

Figures 20, 21:
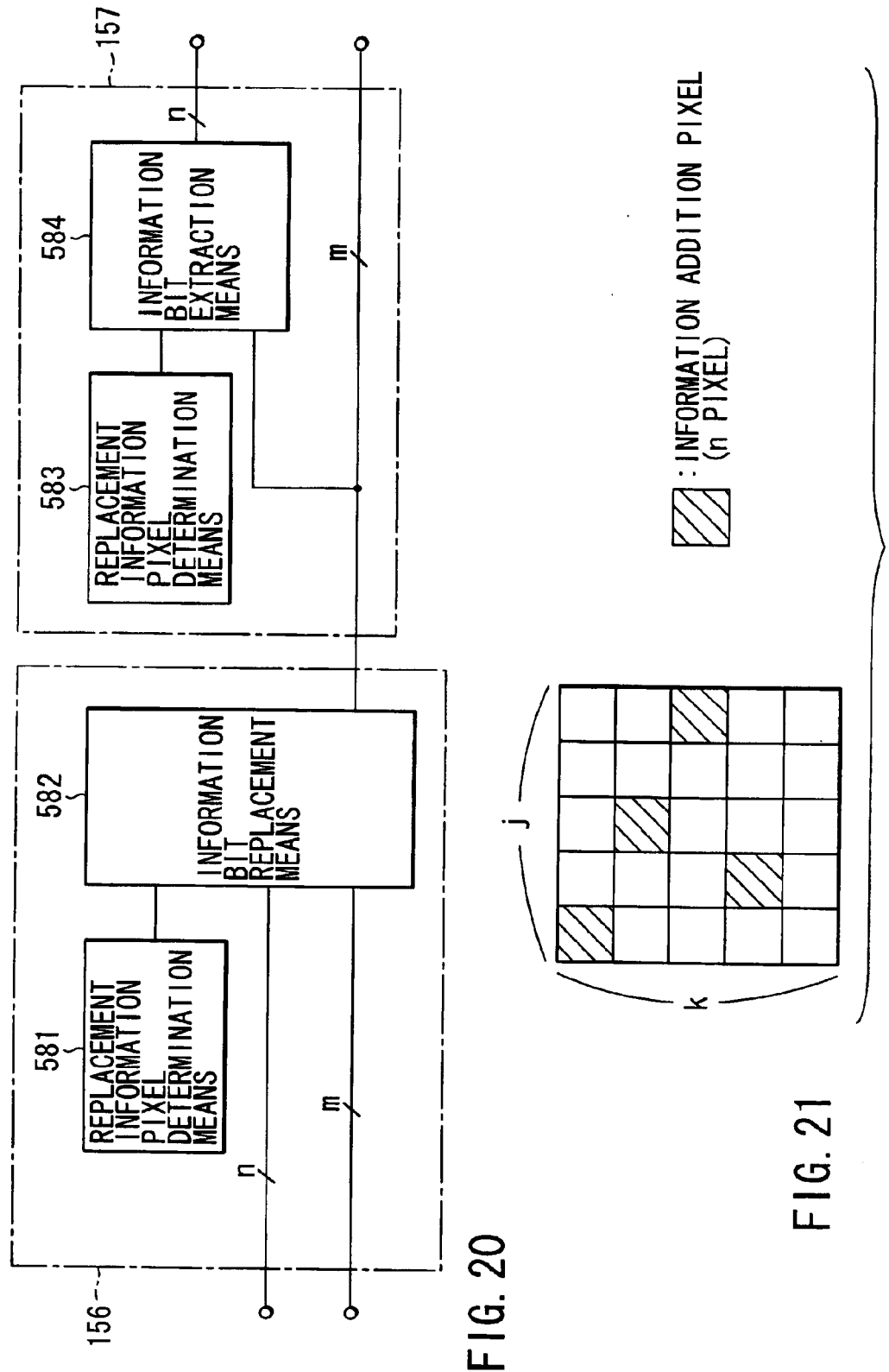
FIG. 20 is a block diagram showing the structures of information addition means and information extraction means according to a third embodiment of the invention.
FIG. 21 shows a case where 4-bit information is added per (5×5) pixels.

FIG. 20 shows structures of the information addition means 156 and information extraction means 157 according to the third embodiment. The information addition means 156 comprises replacement information pixel determination means 581 and information bit replacement means 582. The information extraction means 157 comprises replacement information pixel determination means 583 and information bit extraction means 584.

The structure shown in FIG. 20 is effective in a case where the amount of additional information is smaller than the amount of image information to which it is to be added.

For example, this structure is effective where n-bit information is added to (j×k) pixels. FIG. 21 shows a case where 4-bit information is added to (5×5) pixels. Information is added to pixels (4 pixels) indicated by hatching.

In FIG. 20, the structure of the replacement information pixel determination means 581 is entirely the same as the structure of the replacement information pixel determination means 583. Both are means for determining the positions of pixels to which information is added, as shown in FIG. 21. The information bit replacement means 582 of the information addition means 156 adds n-bit information in accordance with the pixel positions for information addition, which are determined by the replacement information pixel determination means 581. The information bit extraction means 584 of the information extraction means 157 extracts the n-bit information in accordance with the pixel positions for information addition, which are determined by the replacement information pixel determination means 583.

A fourth embodiment of the invention will now be described.

Figure 22:
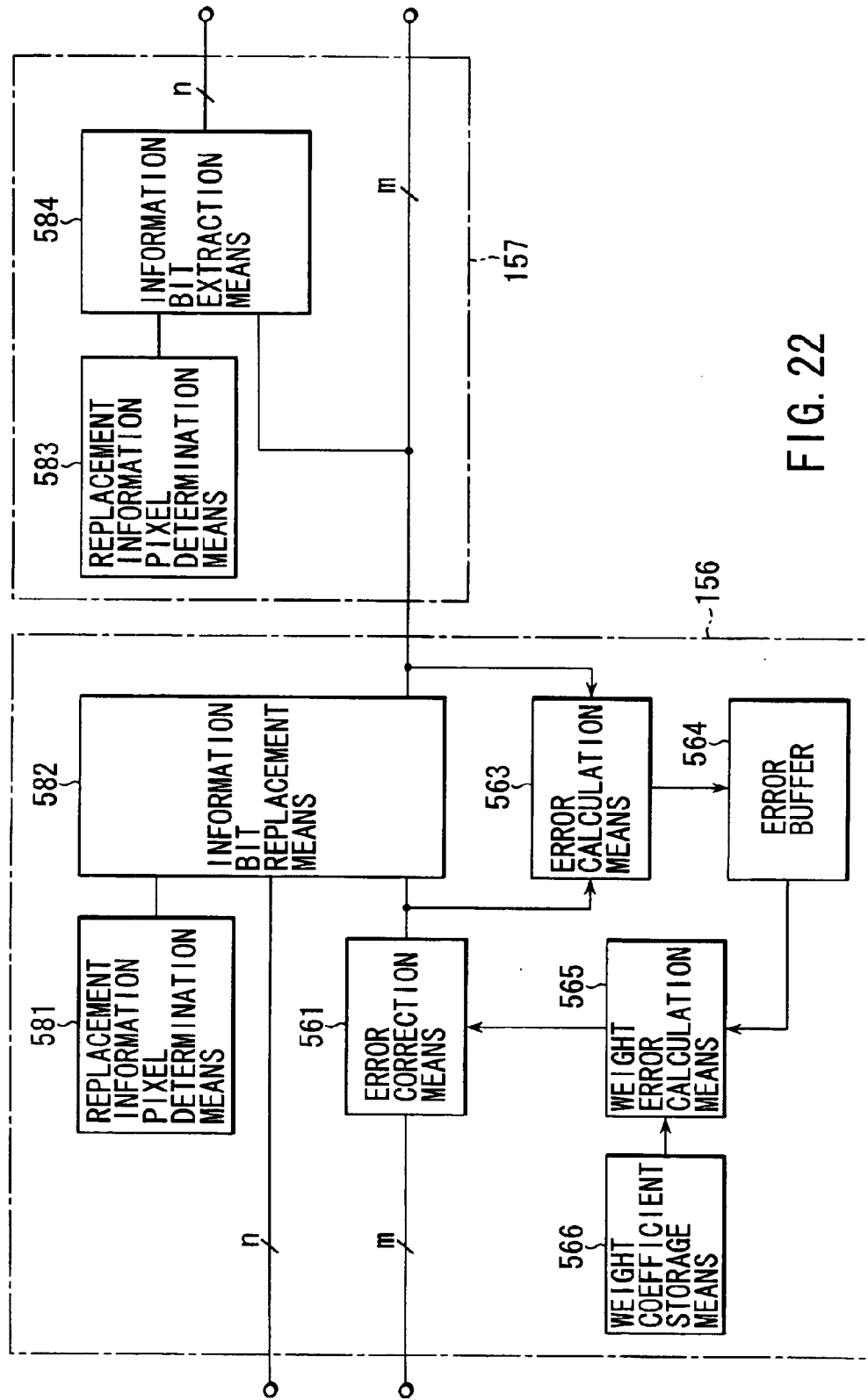
FIG. 22 is a block diagram showing the structures of information addition means and information extraction means according to a fourth embodiment of the invention.

FIG. 22 shows structures of the information addition means 156 and information extraction means 157 according to the fourth embodiment. The common parts are denoted by like reference numerals and a description thereof is omitted.

The information addition means 156 comprises error correction means 561, error calculation means 563, error buffer 564, weight error calculation means 565, weight coefficient storage means 566, replacement information pixel determination means 581 and information bit replacement means 582. The information extraction means 157 comprises replacement information pixel determination means 583 and information bit extraction means 584.

In the structure shown in FIG. 22, the tone curve is further improved in the structure shown in FIG. 20. After the information bit replacement is effected by the information bit replacement means 582, an error between the resultant image and the original image due to the replacement is compensated by the error spread method. The procedure of the error compensation is the same as that described with reference to FIG. 11.

A fifth embodiment of the invention will now be described.

Figure 23:
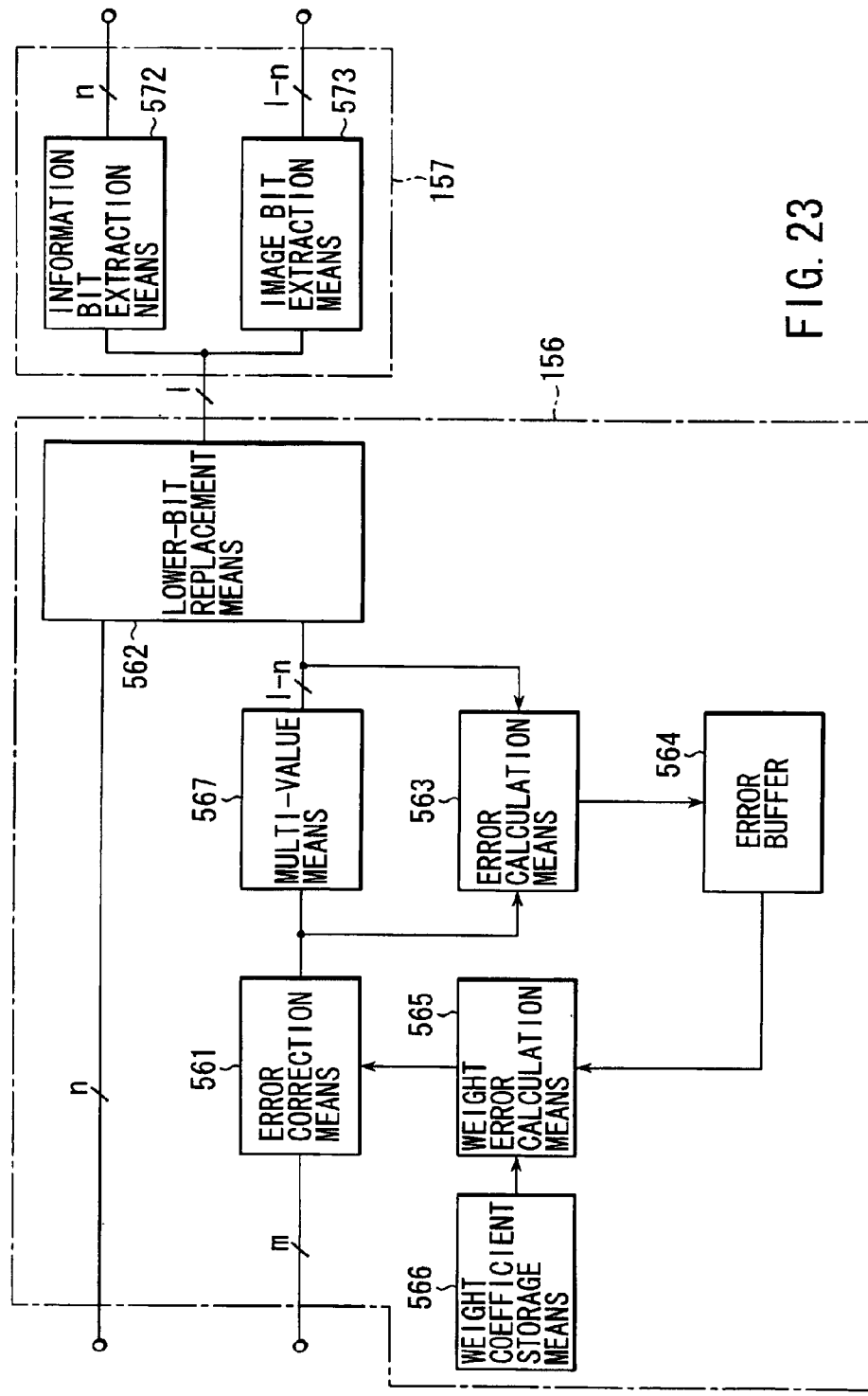
FIG. 23 is a block diagram showing the structures of information addition means and information extraction means according to a fifth embodiment of the invention.

FIG. 23 shows structures of the information addition means 156 and information extraction means 157 according to the fifth embodiment. The common parts are denoted by like reference numerals and a description thereof is omitted.

The information addition means 156 comprises error correction means 561, information bit addition means 562, error calculation means 563, error buffer 564, weight error calculation means 565, weight coefficient storage means 566, and multi-value means 567. The information extraction means 157 comprises information bit extraction means 572 and image bit extraction means 573.

In the second embodiment (FIG. 19), the same m-bit information as the input image signal is output in relation to the m-bit image signal and n-bit additional information. However, in the fifth embodiment (FIG. 23), the output has 1 (1<m) bits. Specifically, the m-bits of the input image signal is reduced to l-n by the multi-value means 567 and then n-bit information is added. For example, the bit numbers can be set as follows: m=8 bits, l=4 bits.

On the other hand, in the information extraction means 157, the addition information is obtained by extracting the lower n bits of the l-bit conversion image signal by the information bit extraction means 572. The image signal is obtained by extracting the l-n bits by the image bit extraction means.

A sixth embodiment of the invention will now be described.

Figure 24:
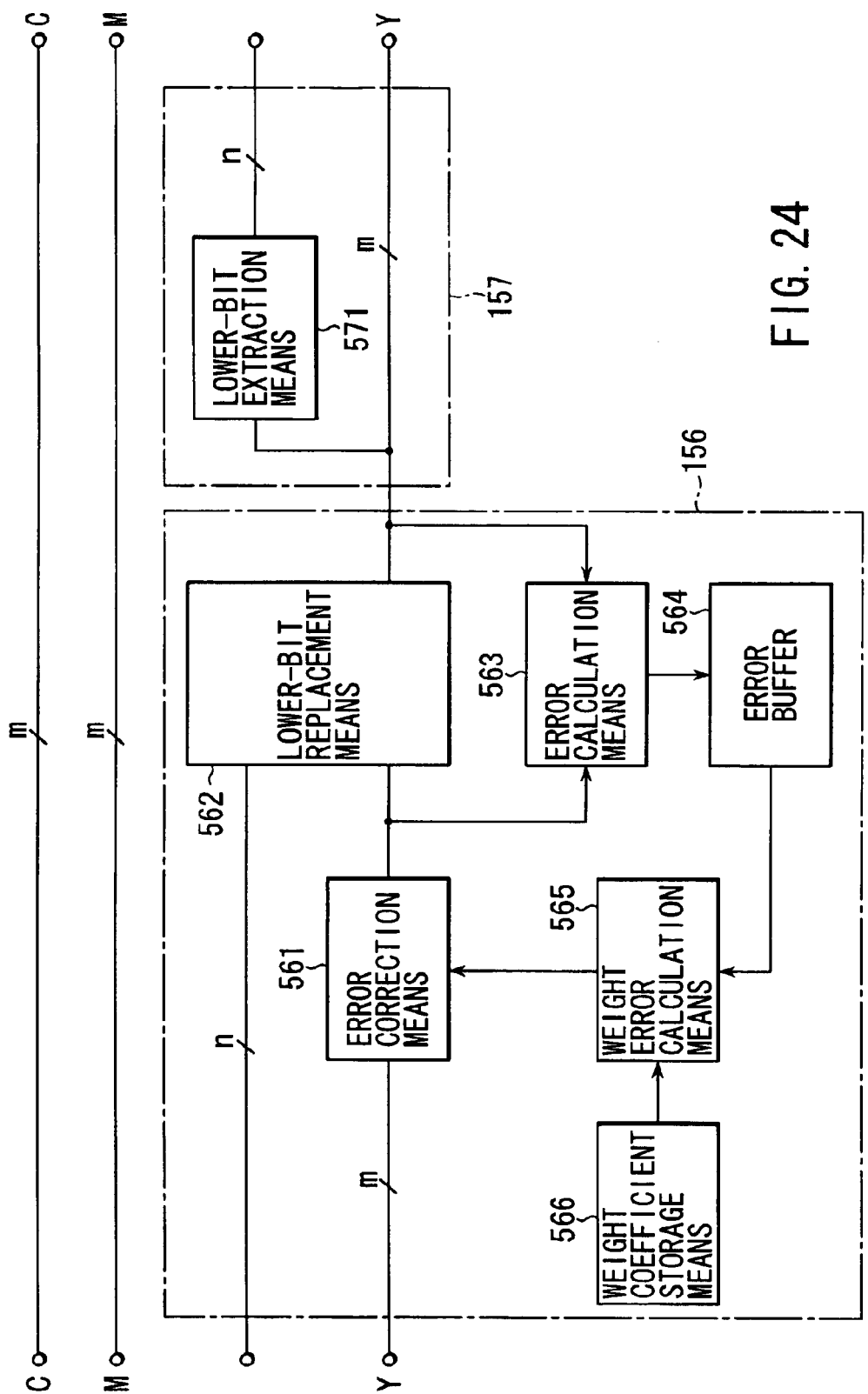
FIG. 24 is a block diagram showing the structures of information addition means and information extraction means according to a sixth embodiment of the invention.

FIG. 24 shows structures of the information addition means 156 and information extraction means 157 according to the sixth embodiment. The common parts are denoted by like reference numerals and a description thereof is omitted.

The information addition means 156 comprises error correction means 561, information bit addition means 562, error calculation means 563, error buffer 564, weight error calculation means 565, and weight coefficient storage means 566. The information extraction means 157 comprises lower-bit extraction means 572.

In the above-described embodiment (FIG. 11), information is added to all color-separation signals (RGB, CMY, CMYK, etc.). In this embodiment, the object color signal for information addition is limited, and the degradation in image quality is suppressed.

In FIG. 24, for example, in the case of CMY signals, the Y signal has such characteristics that it is less visibly sensible. Accordingly, as shown in FIG. 24, information is added to the Y signal alone, and the other color signals C and M of the original image are directly output as such. Thus, the degradation in image quality can be suppressed.

In addition, as regards color signals (L*a*b*, YIQ, etc.) expressed by luminance and color difference, information is added to the color difference signal alone. Thus, the degradation in image quality can be suppressed.

A seventh embodiment of the invention will now be described.

FIG. 25 shows structures of the information addition means 156 and information extraction means 157 according to the seventh embodiment. The common parts are denoted by like reference numerals and a description thereof is omitted.

The information addition means 156 comprises information bit addition means 562 and multi-value dithering means 590. The information extraction means 157 comprises information bit extraction means 572 and image bit extraction means 573.

In each of the preceding embodiments, the bit number of image is reduced by the error spread method. By contrast, in the seventh embodiment shown in FIG. 25, the bit number is reduced by a dithering process carried out by the multi-value dithering means 590.

FIG. 26 illustrates the dithering method, wherein a two-value output is produced.

In FIG. 26, symbol a denotes an input image, symbol b denotes a dither matrix (threshold), and symbol c denotes an output image. In the dither method, digitization is carried out by comparison with a threshold of the dither matrix corresponding to each input pixel. After the bit number is reduced to m-n by the dither method, n-bit information is added to obtain m bits in total. The same method as in the second embodiment (FIG. 19) is used for information bit extraction from the conversion image signal to which information has been added.

An eighth embodiment of the invention will now be described.

Figure 27:
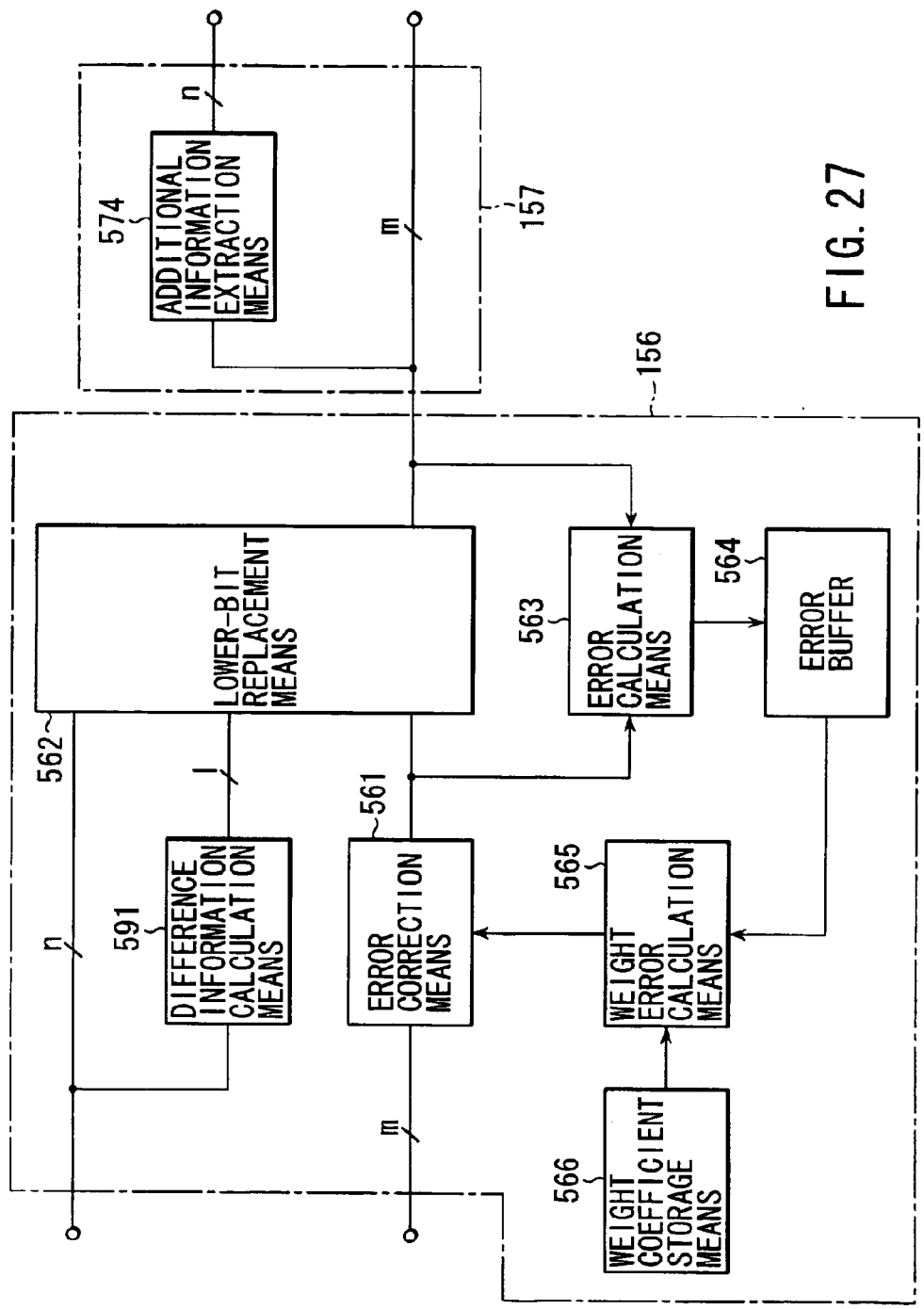
FIG. 27 is a block diagram showing the structures of information addition means and information extraction means according to an eighth embodiment of the invention.

FIG. 27 shows structures of the information addition means 156 and information extraction means 157 according to the eighth embodiment. The common parts are denoted by like reference numerals and a description thereof is omitted.

The information addition means 156 comprises error correction means 561, information bit addition means 562, error calculation means 563, error buffer 564, weight error calculation means 565, weight coefficient storage means 566, and difference information calculation means 591. The information extraction means 157 has additional information extraction means 574.

Assume that in the structure of the first embodiment (FIG. 11), where information to be added is constant, for example, where it is all "0", the lower bits of the image are replaced with "0". In this case, if the error spread is effected, the error is compensated. However, the tone which can be expressed is apparently reduced.

In the structure of the eighth embodiment (FIG. 27), in order to suppress the degradation of image quality in the case where the additional information is constant, difference information of the additional information is calculated by the difference information calculation means 591, and one bit indicating whether there is a difference and n-bit additional information are added to the original image.

FIGS. 28 and 29 illustrate the information addition method in the case of using the difference information. FIG. 28 shows the case where there is a difference, that is, successive additional information varies. In this case, the least significant bit is set to "1" and information is added to the upper n bits. FIG. 29 shows the case where the difference is "0", that is, successive additional information is the same. In this case, the least significant bit is set to "0" and the other bits are output as such. In this method, where the additional information has varied, n+1 bit information is added. Where it does not vary, one bit alone is added and degradation in image quality can be suppressed.

A ninth embodiment of the invention will now be described.

Figure 30:
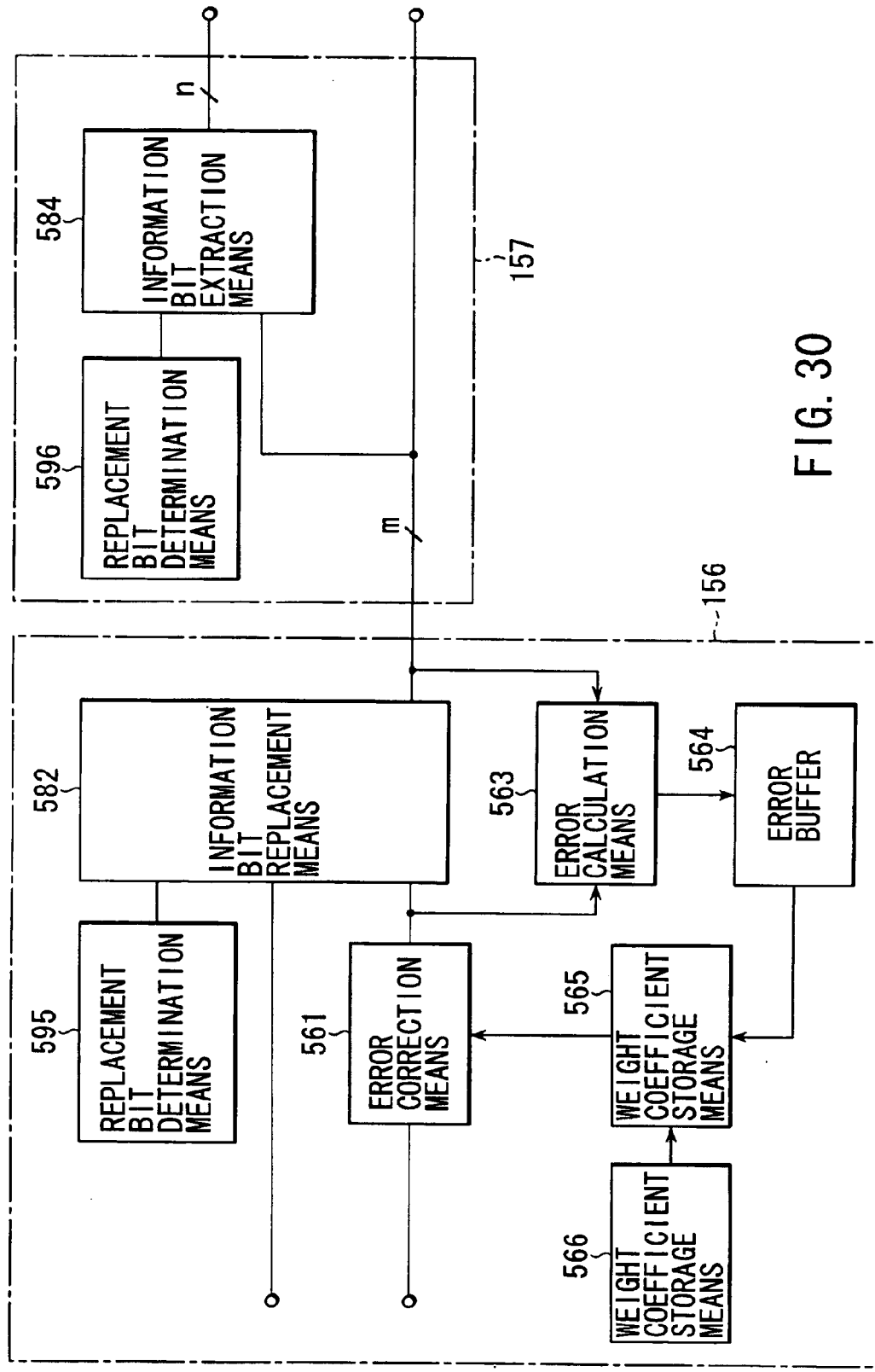
FIG. 30 is a block diagram showing the structures of information addition means and information extraction means according to a ninth embodiment of the invention.

FIG. 30 shows structures of the information addition means 156 and information extraction means 157 according to the ninth embodiment. The common parts are denoted by like reference numerals and a description thereof is omitted.

The information addition means 156 comprises error correction means 561, error calculation means 563, error buffer 564, weight error calculation means 565, weight coefficient storage means 566, information bit replacement means 582, and replacement bit determination means 595. The information extraction means 157 comprises information bit extraction means 584 and replacement bit determination means 596.

In the structure shown in FIG. 30, n-bit information is not substituted for the lower n-bits of the image. Instead, as shown in FIG. 31, n-bit pixels are determined at random or according to a rule from m-bit image by the replacement bit determination means 595, and the determined bits are replaced. Thereby, degradation in image quality can be suppressed even if the information bit is constant.

A tenth embodiment of the invention will now be described.

FIG. 32 shows another embodiment of the lower-bit replacement means 562 shown in FIG. 12. Using a random LUT (lookup table) 597, a bit string of information bits are replaced with another bit string at random or according to a predetermined rule in units of a pixel. After the bit string is replaced, the lower-bit replacement means 562 performs replacement. At the time of bit extraction, a random inverse LUT (lookup table) 598 is used and the original bit string is restored by a similar rule. In this case, even if the information bit is constant, degradation in image can be suppressed.

In FIG. 32, the structure shown in FIG. 11 is omitted in order to describe the above structure. The random LUT 597 is provided at the front stage of the information bit input of the lower-bit replacement means 562 shown in FIG. 11. The random inverse LUT 598 is provided at the rear stage of the lower-bit extraction means 571 shown in FIG. 11.

As has been described above, according to the embodiments of the invention, when a system design using images is carried out, a system using image signals which are not limited to 8 bits can be realized easily and inexpensively, while information is added to image signals with a least degradation in image quality.

Moreover, additional information can exactly be extracted from a conversion image signal to which the additional information has been added.

What is claimed is:

1. An image processing apparatus, wherein:

a first processing circuit and a second processing circuit are connected in m bits, the first processing circuit comprising:

image area separation means for discriminating whether a target image is a character or a photograph on the basis of input image data of red, green, and blue;

color conversion means for converting the input image data of red, green, and blue into color signals of cyan, magenta, and yellow, respectively;

space filter means for executing filtering process on the color signals of cyan, magenta, and yellow, which are converted by the color conversion means, on the basis of discrimination signals discriminated by the image area separation means; and information addition means for outputting an m-bit signal of each color, which is filter-processed by the space filter means, and an n-bit discrimination signal, which is discriminated by the image area separation means, as m-bit information, to the second processing circuit, and the second processing circuit comprising:

information extraction means for extracting both the m-bit signal of each color and the n-bit discrimination signal from m-bit information output by the information addition means;

black-coloring means for generating a black color signal from the color signals of cyan, magenta, and yellow, which are extracted by the information extracting means, on the basis of the discrimination signal, which is extracted by the information extraction means, and for outputting the color signals of cyan, magenta, yellow, and black;

γ correction means for correcting tone characteristics of the color signals of cyan, magenta, yellow, and black, which are output from the black-coloring means, on the basis of the discrimination signal extracted by from the information extraction means; and tone processing means for tone-processing the color signals of cyan, magenta, yellow, and black, which are corrected by the γ correction means, on the basis of the discrimination signal extracted by the information extraction means.

2. The image processing apparatus according to claim 1, wherein:

the information addition means comprises:

error correction means for correcting image information of target pixels in input signals of each color;

lower bit conversion means for converting lower bit of m-bit corrected image signal, which is corrected by the error correction means, into input n-bit discrimination signal, to be output as each m-bit information to the information extraction means;

error calculation means for calculating an error between each m-bit information from the lower bit conversion means and each corrected image signal corrected by the error correction means;

an error buffer for storing each error signal calculated by the error calculation means;

weight coefficient storage means for storing a weight coefficient for calculating a weight error; and weight error calculation means for calculating a weight error by multiplying each error signal stored in the error buffer by the weight coefficient stored in the weight coefficient storage means, and for outputting the calculated weight error to the error correction means; and the information extraction means outputs the m-bit information input from the lower bit conversion means to m-bit color signal, extracts the lower-bit from the m-bit information input by the lower bit extraction means, and outputs the lower-bit from the m-bit information as an n-bit discrimination signal.

3. The image processing apparatus according to claim 1, wherein:

the information addition means comprises:

error correction means for correcting image information of target pixels in the input signals of each color;

multi-value means for subtracting n-bit from each m-bit corrected image signal, which is corrected by the error correction means;

information bit addition means for adding the input n-bit discrimination signal to each m-n bit corrected image signal, from which a bit value is subtracted by the multi-value means, and for outputting a combination of the n-bits and the m-n bits as each m-bit information to the information extraction means;

error calculation means for calculating an error between each m-n bit corrected image signal, which is from the multi-value means, and each corrected image signal, which is corrected by the error correction means;

an error buffer for storing each error signal calculated by the error calculation means;

weight coefficient storage means for storing a weight coefficient for calculating a weight error; and weight error calculation means for calculating a weight error by multiplying each of the error signal stored in the error buffer by the weight coefficient stored in the weight coefficient storage means, and for outputting the calculated weight error to the error correction means; and the information extraction means comprises:

image bit extraction means for extracting m-n bit signals of each color of m-n bit from each m-bit information, which is input from the information bit addition means; and information bit extraction means for extracting each of the discrimination signals of n-bit from each m-bit information, which is input from the information bit addition means.

4. The image processing apparatus according to claim 1, wherein:

the information addition means comprises:

first conversion information pixel-determining means for determining a pixel position where information is added; and information bit conversion means for converting each m-bit information, from the input color signals of each color and each input discrimination signal, according to the pixel position where the information is added by the first conversion information pixel-determining means;

the information extraction means outputs each m-bit information, which is input from the information conversion means, as each m-bit color signal; and the information extraction means comprises:

second conversion information pixel-determining means for determining a pixel position where further information is added; and information bit extraction means for extracting an n-bit discrimination signal from m-bit input information according to the pixel position where the further information is added by the second conversion information pixel-determining means.

5. The image processing apparatus according to claim 1, wherein:

the information addition means comprises:

error correction means for correcting the image information of the target pixels in the input signals of each color;

information bit conversion means for converting each m-bit corrected image signal, which is corrected by the error corrections means, into each discrimination signal, according to a determination of both the first conversion information pixels-determining means for determining the pixel position where further information is added, and the pixel position where further information is added by the first conversion information pixels-determining means, and for outputting each m-bit information to the information extraction means;

error calculation means for calculating the error between each m-bit information from the lower bit conversion means, and each corrected image signal, which is corrected by the error correction means;

an error buffer for storing each error signal calculated by the error calculation means;

weight coefficient storage means for storing a weight coefficient for calculating a weight error; and weight error calculation means for calculating a weight error by multiplying each of the error signal stored in the error buffer by the weight coefficient stored in the weight coefficient storage means, and for outputting the calculated weight error to the error correction means;

the information extraction means outputs each input m-bit information from the information bit conversion means, as the m-bit color signals of each color; and the information extraction means comprises:

second conversion information pixel-determining means for determining a pixel position where further information is added; and information bit extraction means for extracting an n-bit discrimination signal from m-bit input information according to the pixel position where the further information is added by the second conversion information pixel-determining means.

6. The image processing apparatus according claim 1, wherein:

the information addition means comprises:

error correction means for correcting the image information of the target pixels in the input signals of each color;

multi-value means for subtracting a bit-value from each m-bit corrected image signals, which is corrected by the error correction means to l-n bits, l being an integer value less than m;

information bit addition means for adding each input n-bit discrimination signal to each l-n bit corrected image signal and for outputting combination of the n-bits and the l-n bits, as each m-bit information, to the information extraction means;

error calculation means for calculating the error between each of the corrected image signals of l-n bits from the multi-value means and each of the corrected image signals, which is corrected by the error correction means;

an error buffer for storing each error signal calculated by the error calculation means;

weight coefficient storage means for storing the weight coefficient for calculating the weight error; and weight error calculation means for calculating the weight error by multiplying each error signal stored in the error buffer by the weight coefficient stored in the weight coefficient storage means, for outputting the calculated weight error to the error correction means; and the information extracting means comprises:

image extraction means for extracting the l-n bit color signals, from each l-bit information, which is input from the information bit addition means; and information bit extraction means for extracting each n-bit discrimination signal, from each l-bit information, which is input from the information bit addition means.

7. The image processing apparatus according to claim 1, wherein:

the information addition means comprises:

error correction means for correcting the image information of the target pixels in an input signal of yellow color;

lower bit conversion means for converting the lower bit of the m-bit corrected image signal, which is corrected by the error correction means, into the input n-bit discrimination signal to be output as the m-bit information to the information extraction means;

error calculating means for calculating the error between the m-bit information, which is from the lower bit conversion means, and the corrected image signal, which is corrected by the error correction means;

an error buffer for storing each error signal calculated by the error calculation means;

weight coefficient storage means for storing the weight coefficient for calculating a weight error; and weight error calculation means for calculating a weight error by multiplying each error signal stored in the error buffer by the weight coefficient stored in the weight coefficient storage means, and for outputting the calculated weight error to the error correction means; and the information extraction means outputs the m-bit information, which is input from the lower bit conversion means, as the yellow color m-bit signal, and outputs n-bit discrimination signal after extracting lower bit from the m-bit information input by lower bit extraction means.

8. The image processing apparatus according to claim 1, wherein:

the information addition means comprises:

multi-value dithering means for dithering the image information of the target pixels in the input signals of each color, and for subtracting the dithered image information to m-n bit value; and information bit addition means for adding each n-bit input discrimination signal to each m-n bit image signal, from which the bit value is subtracted by the multi-value dithering means, to be each m-bit information to the information extraction means; and the information extraction means comprises:

image bit extraction means for extracting the color signals of each color information of the m-bit input from the information bit addition means; and information bit extraction means for extracting each n-bit discrimination signal, from each m-bit information, which is input from the information bit addition means.

9. The image processing apparatus according to claim 1, wherein the information addition means comprises:

difference information calculation means for calculating difference information of each input discrimination signal;

error correction means for correcting the image information of the target pixels in the input signals of each color;

lower bit conversion means for converting the lower bit of each m-bit corrected image signal, which is corrected by the error correction means, each n-bit discrimination signal, and the l-bit, which indicates whether or not there is a difference calculated by the difference information calculation means, to be output as each m-bit information to the information extraction means;

error calculating means for calculating an error between each m-bit information from the lower bit conversion information and each corrected image signal corrected by the error correction means;

an error buffer for storing each error signal calculated by the error calculation means;

weight coefficient storage means for storing the weight coefficient for calculating a weight error; and weight error calculation means for calculating a weight error by multiplying each error signal stored in the error buffer by the weight coefficient stored in the weight coefficient storage means, for outputting the calculated weight error to the error correction means; and the information extraction means outputs each m-bit information, which is input from the lower bit conversion means as each m-bit color signal, and for extracting lower bit from the information of the m-bit input by additional information extraction means, which is output as each n-bit discrimination signal.

10. The image processing apparatus according to claim 1, wherein:

the information addition means comprises:

first conversion bit determination means for discriminating n-bit in m-bit image signal;

error correction means for correcting image information of the target pixels in the input signals of each color;

information bit conversion means for converting each m-bit corrected image signal, which is corrected by the error correction means, the n-bits discriminated by the conversion bit means, into each n-bit discrimination signal, to be output as each m-bit information to the information extraction means;

error calculating means for calculating an error between the m-bit information from the information bit conversion means and each corrected image signal corrected by the error correction means;

an error buffer for storing each error signal calculated by the error calculation means;

weight coefficient storage means for storing the weight coefficient for calculating a weight error; and weight error calculation means for calculating a weight error by multiplying each error signal stored in the error buffer by the weight coefficient stored in the weight coefficient storage means, and for outputting the calculated weight error to the error correction means;

the information extraction means outputs each m-bit information, which is input from the information bit conversion means, as the m-bit signals of each color; and the information extraction means comprises:

second conversion bit determination means for discriminating n-bits in the m-bit image signals; and information bit extraction means for extracting each discrimination signal of the n-bits, which is discriminated by the second conversion bit determination means, from each input m-bit information.

11. The image processing apparatus according to claim 1, wherein:

the information addition means comprises:

error correction means for correcting the image information of the target pixels in the input signal of each color;

random conversion means for converting the n-bit discrimination signal into a randomly-lined n-bits;

lower bit conversion means for converting the lower n-bit image signals of each m-bit with the randomly-lined n-bits, which are converted by the random conversion means, and for outputting each m-bit information;

error calculation means for calculating the error between each m-bit information, which is from the lower bit conversion means, and each corrected image signal, which is corrected by the error correction means; wherein an error buffer for storing each error signal calculated by the error calculation means;

weight coefficient storage means for storing the weight coefficient for calculating a weight error; and weight error calculation means for calculating a weight error by multiplying each error signal stored in the error buffer by the weight coefficient stored in the weight coefficient storage means, and for outputting the calculated weight error to the error correction means;

the information extraction means outputs each m-bit information, which is input from the lower bit conversion means, as the m-bit signals of each color; and, the information extraction means comprises:

lower bit extraction means for extracting each lower bit from the information of each input m-bits; and random reverse conversion means for reverse-converting each lower n-bits, which is extracted by the lower bit extraction means.

* * * * *